United States Patent
Yu et al.

(10) Patent No.: US 12,550,136 B2
(45) Date of Patent: Feb. 10, 2026

(54) METHOD AND APPARATUS FOR INDICATING NUMBER OF REPETITIONS

(71) Applicant: Huawei Technologies Co., Ltd., Shenzhen (CN)

(72) Inventors: Yawei Yu, Shenzhen (CN); Zhiheng Guo, Beijing (CN); Xinqian Xie, Beijing (CN); Yongqiang Fei, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 296 days.

(21) Appl. No.: 17/843,650

(22) Filed: Jun. 17, 2022

(65) Prior Publication Data

US 2022/0322396 A1 Oct. 6, 2022

Related U.S. Application Data

(63) Continuation of application No. PCT/CN2019/126114, filed on Dec. 17, 2019.

(51) Int. Cl.
*H04W 72/1268* (2023.01)
*H04L 1/00* (2006.01)
(Continued)

(52) U.S. Cl.
CPC ....... *H04W 72/1268* (2013.01); *H04L 1/0004* (2013.01); *H04L 1/08* (2013.01); *H04L 5/0051* (2013.01); *H04W 72/23* (2023.01)

(58) Field of Classification Search
CPC ............ H04W 72/1268; H04W 72/23; H04L 1/0004; H04L 5/0051
See application file for complete search history.

(56) References Cited

U.S. PATENT DOCUMENTS

2016/0211949 A1* 7/2016 You .................. H04W 72/23
2018/0115387 A1* 4/2018 Takeda ................ H04L 1/0003
(Continued)

FOREIGN PATENT DOCUMENTS

CN 108111282 A 6/2018
CN 109302273 A 2/2019
(Continued)

OTHER PUBLICATIONS

"DCI design for Rel-13 MTC UEs and UEs in enhanced coverage," 3GPP TSG RAN WG1 Meeting #82bis, R1-155168, Total 3 pages, 3rd Generation Partnership Project, Valbonne, France (Oct. 5-9, 2015).

(Continued)

*Primary Examiner* — Yemane Mesfin
*Assistant Examiner* — Salma Ayad
(74) *Attorney, Agent, or Firm* — Leydig, Voit & Mayer, Ltd.

(57) ABSTRACT

A method for indicating a number of repetitions, so that a configuration of a number of repetitions of a sounding reference signal (SRS) and/or a physical uplink shared channel (PUSCH) is more adaptive to a channel change, includes: A network device sends downlink control information (DCI) to a terminal device, where the DCI includes first indication information, and the first indication information indicates a number of repetitions of an SRS and/or a PUSCH. Because the DCI has a faster update process than radio resource control (RRC) signaling, and overheads are smaller than those of the RRC signaling, the network side device may flexibly configure the number of repetitions of the SRS and/or the PUSCH by using the DCI, to better adapt to the channel change, and further improve a channel estimation capability and signal demodulation performance.

20 Claims, 5 Drawing Sheets

(51) Int. Cl.
  *H04L 1/08* (2006.01)
  *H04L 5/00* (2006.01)
  *H04W 72/23* (2023.01)

(56) References Cited

U.S. PATENT DOCUMENTS

| | | | | |
|---|---|---|---|---|
| 2018/0145813 | A1* | 5/2018 | Yi | H04W 76/27 |
| 2019/0045552 | A1 | 2/2019 | Blankenship et al. | |
| 2019/0223183 | A1* | 7/2019 | Urabayashi | H04W 72/0453 |
| 2021/0176776 | A1* | 6/2021 | Choi | H04L 1/1819 |
| 2021/0250972 | A1* | 8/2021 | Munier | H04W 72/23 |
| 2022/0045792 | A1* | 2/2022 | Song | H04W 72/232 |
| 2022/0271880 | A1* | 8/2022 | Choi | H04W 72/23 |
| 2022/0377764 | A1* | 11/2022 | Choi | H04L 1/1816 |
| 2022/0393835 | A1* | 12/2022 | Mu | H04W 72/23 |
| 2023/0239864 | A1* | 7/2023 | Kim | H04W 72/23 370/329 |
| 2023/0361971 | A1* | 11/2023 | Mu | H04L 1/189 |
| 2024/0008036 | A1* | 1/2024 | Choi | H04W 72/542 |

FOREIGN PATENT DOCUMENTS

| | | | |
|---|---|---|---|
| CN | 109769303 A | 5/2019 | |
| CN | 110536450 A | 12/2019 | |
| EP | 3236610 A1 | 10/2017 | |
| WO | WO-2016163502 A1 * | 10/2016 | H04B 7/02 |

OTHER PUBLICATIONS

"Remaining issues on beam management," 3GPP TSG RAN WG1 Meeting #92bis, R1-1804845, Total 5 pages, 3rd Generation Partnership Project, Valbonne, France (Apr. 16-20, 2018).

"3rd Generation Partnership Project; Technical Specification Group Radio Access Network; NR; Physical layer procedures for control (Release 15)," 3GPP TS 38.213 V15.7.0, pp. 1-108, 3rd Generation Partnership Project, Valbonne, France (Sep. 2019).

"3rd Generation Partnership Project; Technical Specification Group Radio Access Network; NR; Physical layer procedures for data (Release 15)," 3GPP TS 38.214 V2.0.0, pp. 1-71, 3rd Generation Partnership Project, Valbonne, France (Dec. 2017).

"DCI design for Rel-13 MTC UEs and UEs in enhanced coverage," 3GPP TSG RAN WG1 Meeting #81, Fukuoka, Japan, R1-153901, XP051001331, Total 2 pages, 3rd Generation Partnership Project, Valbonne, France (May 25-29, 2015).

"3rd Generation Partnership Project; Technical Specification Group Radio Access Network; NR; Multiplexing and channel coding (Release 15)," 3GPP TS 38.212 V15.7.0, Technical Specification, total 109 pages, 3rd Generation. Partnership Project, Valbonne, France (Sep. 2019).

* cited by examiner

METHOD AND APPARATUS FOR INDICATING NUMBER OF REPETITIONS

CROSS-REFERENCE TO RELATED APPLICATIONS

This application is a continuation of International Application No. PCT/CN2019/126114, filed on Dec. 17, 2019, the disclosure of which is hereby incorporated by reference in its entirety.

TECHNICAL FIELD

This application relates to the field of wireless communications technologies, and in particular, to a method and an apparatus for indicating a number of repetitions.

BACKGROUND

In a process of communication between a terminal (user equipment, UE) and a base station (eNB), an SRS (sounding reference signal) and a DMRS (demodulation reference signal) are two reference signals sent by the UE to the base station, and are used by the base station to perform channel estimation and data demodulation on an uplink transmission channel.

Accuracy of channel estimation directly affects efficiency and reliability of data transmission between the base station and the terminal. For example, when SRS-based channel estimation is inaccurate, the base station may use an inaccurate MCS (modulation and coding scheme) to schedule PUSCH (physical uplink shared channel) transmission, and may use an excessively high modulation mode/code rate when channel quality is poor, resulting in a decoding failure of the terminal; or may use an excessively low modulation mode/code rate when channel quality is good, resulting in little valid information that is transmitted. Therefore, it is important to ensure accurate sounding reference signal SRS-based channel estimation for system performance. In addition, because the DMRS and data are both carried on a PUSCH and same precoding is used, when DMRS-based channel estimation is inaccurate, the base station may fail to correctly demodulate the data carried on the received PUSCH, resulting in a decrease in a data transmission rate of a system.

To ensure accurate channel estimation, an existing NR (new radio access technology) protocol defines a repetition manner for the SRS and the PUSCH (including the DMRS and a data signal). The base station configures, for the terminal by using RRC (radio resource control) signaling, numbers of repetitions of the SRS and the PUSCH. Through a plurality of repetitions, the base station can combine received signals, so that an SNR (signal to noise ratio) (or S/N (signal to noise ratio)) of the received signals increases, to improve a channel estimation capability and signal demodulation performance.

Currently, the RRC signaling is used for a plurality of processes such as connection management, radio bearer control, and connection mobility. As a result, an update process of the RRC signaling is slow, and an update of the number, configured in the RRC signaling received by the terminal, of repetitions of the SRS and/or the PUSCH has a large delay, which cannot be flexibly and dynamically adapted to a transmission channel change, resulting in a poor channel estimation capability and poor signal demodulation performance.

SUMMARY

This application provides a method and an apparatus for indicating a number of repetitions, so that a configuration of a number of repetitions of an SRS and/or a PUSCH is more adaptive to a channel change.

According to a first aspect, this application provides a method for indicating a number of repetitions. The method includes: A terminal receives DCI (downlink control information) sent by a network side device. The DCI includes indication information. The terminal may determine a number of repetitions of an SRS and/or a PUSCH based on the indication information (referred to as first indication information) of the DCI.

According to the foregoing embodiment, the network side device dynamically indicates the number of repetitions of the SRS and/or the PUSCH based on the DCI, and the terminal determines the number of repetitions of the SRS and/or the PUSCH based on the first indication information of the DCI. Because the DCI has a faster update process than RRC signaling, the number of repetitions of the SRS and/or the PUSCH can be dynamically configured by using the DCI, to better adapt to a channel change, and further improve a channel estimation capability and signal demodulation performance.

In an exemplary embodiment, the first indication information is carried in an existing field in the DCI, or the first indication information is carried in an extension field in the DCI, and the existing field in the DCI includes a modulation and coding scheme MCS index.

In an exemplary embodiment, when the first indication information is an MCS index value, the terminal may determine a number, corresponding to the MCS index value, of repetitions of the SRS and/or the PUSCH based on a first correspondence. The first correspondence includes a correspondence between different MCS index values and different numbers of repetitions of the SRS and/or the PUSCH.

In an exemplary embodiment, the MCS index value includes a redundant value and a valid value. When the first indication information is a valid MCS index value, the terminal receives trigger information sent by the network side device. The trigger information indicates the terminal to determine the number of repetitions of the SRS and/or the PUSCH based on the first indication information.

In the foregoing embodiment, an existing field (MCS index) in current DCI indicates the number of repetitions of the SRS and/or the PUSCH, and additional signaling (trigger information) needs to be used to trigger the terminal to perform new interpretation on the existing field of the DCI. For example, for DCI for scheduling the PUSCH, an MCS index in the DCI indicates a modulation order and a code rate of the PUSCH. When indicating the number of repetitions of the SRS and/or the PUSCH by using a valid value of the MCS index, the network device may trigger, by using trigger information, the terminal to determine, when interpreting the MCS index value in the DCI, the number of repetitions of the SRS and/or the PUSCH based on the MCS index value, in addition to determining the corresponding modulation order and code rate based on the MCS index value. Alternatively, the terminal is triggered to only perform new interpretation on the MCS index in the DCI, that is, only determine a corresponding number of repetitions of the SRS and/or the PUSCH based on the MCS index value.

The trigger information may be a dynamic indication parameter that is configured in the RRC for a number of repetitions, for example, 'DynamicalRepetition'. The dynamic indication parameter has different values to indicate whether to trigger the terminal to perform new interpretation on the existing field of the DCI. For example, if the dynamic indication parameter is 1, the terminal is triggered to perform new interpretation; if the dynamic indication parameter is 0, it indicates that the terminal does not need to perform new interpretation; or if the RRC does not carry the dynamic indication parameter, it indicates that the terminal does not need to perform new interpretation.

It should be noted that, when an existing field of the DCI is used and a redundant value of the existing field (for example, a redundant value of the MCS index) indicates the number of repetitions of the SRS and/or the PUSCH, or when an extension field of the DCI carries the first indication information, the network side device may not trigger, by using additional signaling, the terminal to perform new interpretation. For example, when the redundant value of the MCS index of the DCI is used for indication, after receiving the DCI, the terminal may determine the number of repetitions of the SRS and/or the number of repetitions of the PUSCH based on the redundant MCS index value. Similarly, when the extension field is used to carry the first indication information, after receiving the DCI, the terminal may determine the number of repetitions of the SRS and/or the number of repetitions of the PUSCH based on the first indication information carried in the extension field of the DCI. In other words, after delivering the DCI, the network side device does not need to trigger, by using additional signaling, the terminal to interpret the first indication information.

In the foregoing manner, resource overheads can be reduced while the number of repetitions of the SRS and/or the PUSCH is dynamically configured.

In an exemplary embodiment, the first indication information is carried in the extension field in the DCI. The terminal determines the number of repetitions of the SRS and/or the PUSCH based on a value of the extension field. Alternatively, the terminal determines a number, corresponding to a value index of the extension field, of repetitions of the SRS and/or the PUSCH based on a second correspondence. The second correspondence includes a correspondence between different value indexes of the extension field and different numbers of repetitions of the SRS and/or the PUSCH.

In an exemplary embodiment, before receiving the DCI, the terminal may further receive radio resource control RRC signaling. The RRC signaling includes second indication information, and the second indication information indicates a first number of repetitions of the SRS and/or the PUSCH. The terminal determines the number of repetitions of the SRS and/or the PUSCH based on the second indication information. Alternatively, the terminal obtains the number of repetitions of the SRS and/or the PUSCH by using an adjustment value indicated by the first indication information and the first number, indicated by the second indication information, of repetitions of the SRS and/or the PUSCH.

In the foregoing embodiment, the number of repetitions of the SRS and/or the PUSCH is determined based on the RRC signaling and the DCI. If a channel state is stable, the number of repetitions of the SRS and/or the PUSCH is semi-statically configured by using the RRC signaling, to reduce signaling overheads for indicating the number of repetitions of the SRS and/or the PUSCH. If the channel state changes, the first number, indicated by the second indication information in the RRC signaling, of repetitions of the SRS and/or PUSCH can be dynamically adjusted by using the DCI. The indication manner is flexible, and improves a channel estimation capability and signal demodulation performance.

In an exemplary embodiment, when the first indication information is an indication value, the terminal may further determine, based on a third correspondence, an adjustment value corresponding to the indication value. The third correspondence is a correspondence between different indication values and different adjustment values for adjusting the number of repetitions of the SRS and/or the PUSCH.

In an exemplary embodiment, the terminal selects, based on the first indication information, a candidate value from a plurality of preset candidate values except the number, indicated by the second indication information, of repetitions of the SRS, and uses the selected candidate value as a determined number of repetitions of the SRS.

In an exemplary embodiment, if the number of repetitions of the SRS is greater than 1, the terminal sends a subsequent SRS by using a transmit parameter for sending the first SRS, until a number of times of sending the SRS by using a same slot reaches the determined number of repetitions of the SRS. If the number of repetitions of the PUSCH is greater than 1, the terminal sends a subsequent PUSCH by using a transmit parameter for sending the first PUSCH, until a number of times of sending the PUSCH by using a same radio frame reaches the determined number of repetitions of the PUSCH.

The transmit parameter includes transmit power, an antenna port, a beam direction, and a frequency domain resource.

According to a second aspect, this application provides a method for indicating a number of repetitions. The method includes: A network side device sends downlink control signaling DCI to a terminal. The DCI includes first indication information, and the first indication information indicates a number of repetitions of an SRS and/or a physical uplink shared channel PUSCH.

In an exemplary embodiment, the first indication information is carried in an existing field in the DCI, or the first indication information is carried in an extension field in the DCI, and the existing field in the DCI includes a modulation and coding scheme MCS index.

In an exemplary embodiment, the first indication information is an MCS index value.

The first indication information is for the terminal to determine a number, corresponding to the MCS index value, of repetitions of the SRS and/or the PUSCH based on a first correspondence. The first correspondence includes a correspondence between different MCS index values and different numbers of repetitions of the SRS and/or the PUSCH.

In an exemplary embodiment, the first indication information is carried in the extension field in the DCI.

The extension field is for the terminal to determine the number of repetitions of the SRS and/or the PUSCH based on a value of the extension field. Alternatively, the extension field is for the terminal to determine a number, corresponding to a value index of the extension field, of repetitions of the SRS and/or the PUSCH based on a third correspondence. The third correspondence includes a correspondence between different value indexes and different numbers of repetitions of the SRS and/or the PUSCH.

In an exemplary embodiment, the network side device sends radio resource control RRC signaling to the terminal. The RRC signaling includes second indication information, and the second indication information indicates a number of repetitions of the SRS and/or the PUSCH. The first indication information indicates the number of repetitions of the SRS and/or the PUSCH. Alternatively, the first indication information indicates an adjustment value for adjusting the number, indicated by the second indication information, of repetitions of the SRS and/or the PUSCH, so that the terminal obtains the number of repetitions of the SRS and/or the PUSCH based on the adjustment value and the first number, indicated by the received second indication information, of repetitions of the SRS and/or the PUSCH.

In an exemplary embodiment, the first indication information is an indication value. The indication value is for the terminal to determine, based on a third correspondence, an adjustment value corresponding to the indication value. The third correspondence is a correspondence between different indication values and different adjustment values for adjusting the number of repetitions of the SRS and/or the PUSCH.

In an exemplary embodiment, the first indication information indicates the terminal to select a candidate value from a plurality of preset candidate values except the number, indicated by the second indication information, of repetitions of the SRS, and use the selected candidate value as a determined number of repetitions of the SRS.

According to a third aspect, an embodiment of this application provides a communications apparatus. The apparatus has a function of implementing the method in any one of the first aspect or the exemplary embodiments of the first aspect. The function may be implemented by hardware, or may be implemented by hardware executing corresponding software. The hardware or the software includes one or more modules corresponding to the foregoing functions, for example, a transceiver unit and a processing unit.

In an exemplary embodiment, the apparatus may be a chip or an integrated circuit.

In an exemplary embodiment, the apparatus includes a memory and a processor. The memory is configured to store a program executed by the processor. When the program is executed by the processor, the apparatus may perform the method in any one of the first aspect or the exemplary embodiments of the first aspect.

In an exemplary embodiment, the apparatus may be a terminal device.

According to a fourth aspect, an embodiment of this application provides a communications apparatus. The apparatus has a function of implementing the method in any one of the second aspect or the exemplary embodiments of the second aspect. The function may be implemented by hardware, or may be implemented by hardware executing corresponding software. The hardware or the software includes one or more modules corresponding to the foregoing functions, for example, a sending unit and a processing unit.

In an exemplary embodiment, the apparatus may be a chip or an integrated circuit.

In an exemplary embodiment, the apparatus includes a memory and a processor. The memory is configured to store a program executed by the processor. When the program is executed by the processor, the apparatus may perform the method in any one of the second aspect or the exemplary embodiments of the second aspect.

In an exemplary embodiment, the apparatus may be a network side device.

According to a fifth aspect, a system is provided. The system includes at least one network side device described above and at least one terminal described above.

According to a sixth aspect, an embodiment of this application provides a computer-readable storage medium. The storage medium stores computer instructions. When the computer instructions are executed, the method in any one of the first aspect or the exemplary embodiments of the first aspect or the method in any one of the second aspect or the exemplary embodiments of the second aspect may be implemented.

According to a seventh aspect, an embodiment of this application further provides a computer program product, including a computer program or instructions. When the computer program or the instructions are executed, the method in any one of the first aspect or the exemplary embodiments of the first aspect or the method in any one of the second aspect or the exemplary embodiments of the second aspect may be implemented.

According to an eighth aspect, an embodiment of this application further provides a chip. The chip is coupled to a memory, and is configured to read and execute program instructions stored in the memory, to implement the method in any one of the first aspect or the exemplary embodiments of the first aspect, or the method in any one of the second aspect or the exemplary embodiments of the second aspect.

DESCRIPTION OF EMBODIMENTS

To make objectives, technical solutions, and advantages of this application clearer, the following further describes this application in detail with reference to the accompanying drawings. A specific operation method in a method embodiment may also be applied to a device embodiment or a system embodiment. In the descriptions of this application, unless otherwise specified, "a plurality of" means two or more.

Figure 1:
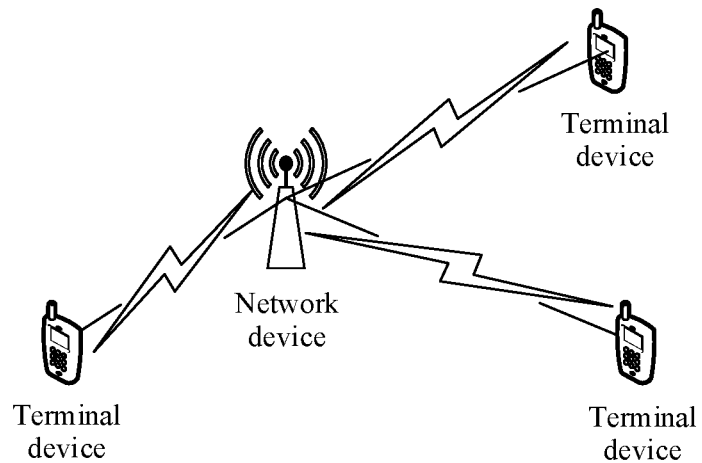
FIG. 1 is a diagram of an architecture of a communications system according to an embodiment of this application.

FIG. 1 is a schematic diagram of an exemplary network architecture to which this application is applicable, including a network device and at least one terminal device. The network device and the terminal device may work in a new radio (NR) communications system, and the terminal device may communicate with the network device by using the NR communications system. The network device and the terminal device may also work in another communications system. This is not limited in embodiments of this application.

The terminal device (user equipment, UE) may be a wireless terminal device that can receive scheduling and first indication information of the network device. The wireless terminal device may be a device that provides voice and/or data connectivity for a user, a handheld device having a wireless connection function, or another processing device connected to a wireless modem. The wireless terminal device may communicate with one or more core networks or the Internet by using a radio access network (RAN). The wireless terminal device may be a mobile terminal device, such as a mobile phone (mobile phone, or referred to as a "cellular" phone or a cell phone), a computer, and a data card, for example, may be a portable, pocket-sized, hand-held, computer built-in, or vehicle-mounted mobile apparatus that exchanges a language and/or data with the radio access network. For example, it may be a device such as a personal communications service (PCS) phone, a cordless telephone set, a session initiation protocol (SIP) phone, a wireless local loop (WLL) station, or a personal digital assistant (PDA), a tablet computer (Pad), and a computer having wireless receiving and sending functions. The wireless terminal device may also be referred to as a system, a subscriber unit, a subscriber station, a mobile station, a mobile station (MS), a remote station, an access point (AP), a remote terminal device, an access terminal device (access terminal), a user terminal device (user terminal), a user agent, a subscriber station (SS), customer premises equipment (CPE), a terminal, user equipment (UE), a mobile terminal (MT), or the like. Alternatively, the wireless terminal device may be a wearable device and a next-generation communications system, for example, a terminal device in a 5G network, a terminal device in a future evolved public land mobile network (PLMN) network, or a terminal device in an NR communications system.

The network device is an entity on a network side that is configured to transmit or receive signals, for example, a generation NodeB (gNodeB). The network device may be a device configured to communicate with a mobile device. The network device may be an AP in a wireless local area network (WLAN), a base transceiver station (BTS) in a global system for mobile communications (GSM) or code division multiple access (CDMA), or may be a NodeB (NB) in wideband code division multiple access (WCDMA), or may be an evolved NodeB (eNB or eNodeB) in long term evolution (LTE), or a relay station, an access point, a vehicle-mounted device, a wearable device, a network device in a future 5G network, a network device in a future evolved public land mobile network (PLMN) network, a gNodeB in an NR system, or the like. In addition, in embodiments of this application, the network device provides a service for a cell, and the terminal device communicates with the network device by using a transmission resource (for example, a frequency domain resource, or referred to as a spectrum resource) used by the cell. The cell may be a cell corresponding to the network device (for example, a base station). The cell may belong to a macro base station, or may belong to a base station corresponding to a small cell. The small cell herein may include: a metro cell, a micro cell, a pico cell, a femto cell, and the like. These small cells have characteristics of a small coverage area and low transmit power, and are suitable to provide a high-rate data transmission service. In addition, in another exemplary case, the network device may be another apparatus that provides a wireless communications function for the terminal device. A specific technology and a specific device form that are used by the network device are not limited in embodiments of this application. For ease of description, in embodiments of this application, an apparatus that provides a wireless communications function for the terminal device is referred to as a network device.

To resolve the problem mentioned in background, this application provides a solution. The network side device notifies the terminal of a number of repetitions of an SRS and/or a PUSCH by using DCI. Because the DCI belongs to physical layer control signaling, which has a faster update process than RRC signaling, the network side device can flexibly configure the number of repetitions of the SRS and/or the PUSCH by using the DCI, to better adapt to a channel change, to improve a channel estimation capability and signal demodulation performance.

Figure 2:
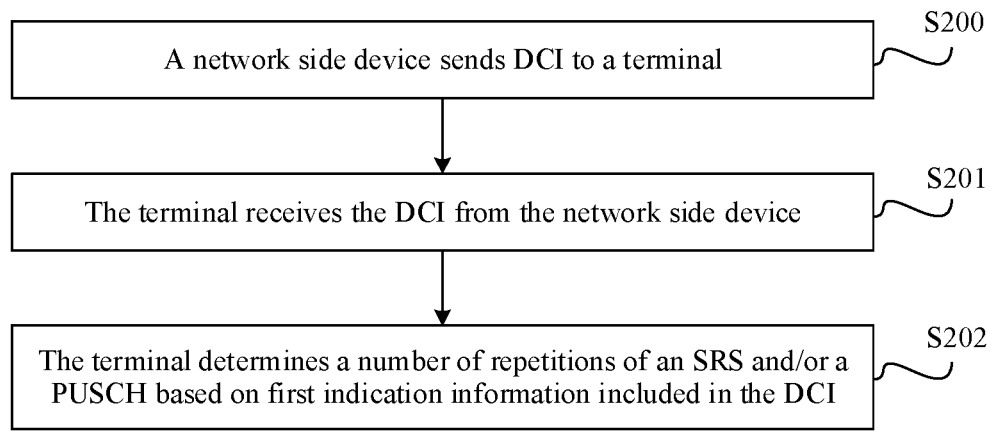
FIG. 2 is a schematic diagram of a method for indicating a number of repetitions according to an embodiment of this application.

The following describes, with reference to the accompanying drawings, the foregoing solution provided in this application. Based on the architecture shown in FIG. 1, as shown in FIG. 2, this application provides a method for indicating a number of repetitions. The method includes the following steps.

Step 200: The network side device sends DCI to the terminal. The DCI includes first indication information, and the first indication information indicates a number of repetitions of an SRS and/or a PUSCH.

The network side device configures the number of repetitions of the SRS based on candidate values of the number of repetitions of the SRS (referred to as SRS candidate values for short below), that is, the number, configured by the network side device for the terminal, of repetitions of the SRS is one of the SRS candidate values. The network side device configures the number of repetitions of the PUSCH based on candidate values of the number of repetitions of the PUSCH (referred to as PUSCH candidate values for short below), and similarly, the number, configured by the network side device for the terminal, of repetitions of the PUSCH is one of the PUSCH candidate values.

Currently, the SRS candidate values include {1, 2, 4}, and the PUSCH candidate values include {1, 2, 4, 8}. The following describes the technical solutions of this application by using the SRS candidate values and the PUSCH candidate values as examples.

Step 201: The terminal receives the DCI from the network side device.

Step 202: The terminal determines the number of repetitions of the SRS and/or the PUSCH based on the first indication information of the DCI.

Based on the foregoing method, the network side device dynamically configures the number of repetitions of the SRS and/or the PUSCH by using the DCI, and the terminal determines the number of repetitions of the SRS and/or the PUSCH based on the first indication information in the DCI. Because the DCI has a faster update speed, the network side device can dynamically configure the number of repetitions of the SRS and/or the PUSCH of the terminal device by using the DCI, to better adapt to a channel change, to improve a channel estimation capability and signal demodulation performance.

In this embodiment of this application, there are a plurality of implementations of indicating the number of repetitions of the SRS and/or the PUSCH by using the DCI. For example, an existing field (for example, an MCS index) in the DCI is used for indication, a newly added field (referred to as an extension field below) in the DCI is used for indication, or the DCI and RRC signaling are jointly used for indication. Specific implementations are as follows.

Implementation 1: An existing field in the DCI indicates the number of repetitions of the SRS and/or the PUSCH.

For example, the number of repetitions of the SRS and/or the PUSCH may be indicated by using an existing field, namely, an MCS index, in the DCI.

Specifically, the network side device sends DCI to the terminal, the DCI includes first indication information, the first indication information may be an MCS index value in the DCI, and the MCS index value indicates a number, corresponding to the MCS index value, of repetitions of an SRS and/or a PUSCH to the terminal.

Correspondingly, the terminal receives the DCI from the network side device, and determines the number of repetitions of the SRS and/or the PUSCH based on the first indication information in the DCI. For example, the first indication information may be the MCS index value in the DCI, and the terminal determines the number, corresponding to the MCS index value included in the received DCI, of repetitions of the SRS and/or the PUSCH based on a correspondence between the MCS index value and the number of repetitions of the SRS and/or the PUSCH.

When the number of repetitions of the SRS and/or the PUSCH is indicated by using the existing field in the DCI, a valid MCS value or a redundant MCS value may be used for indication.

It may be understood that the valid value of the MCS index is a value that currently has been used to indicate a communication parameter to the terminal. For example, a valid value of an MCS index of DCI used to schedule a PUSCH indicates a modulation order and a code rate of the PUSCH (the MCS index is described in detail below in Table 1). Therefore, in this application, when the first indication information is an MCS index value, and the MCS index value is a valid value of the MCS index, the network side device may send trigger information (which may also be referred to as third indication information) to the terminal. The trigger information may be carried in RRC signaling, to indicate the terminal whether to determine the number of repetitions of the SRS and/or the PUSCH by using the valid value of the MCS index. For example, the trigger information may be a parameter 'dynamic repetition' (dynamic indication) configured in the RRC signaling, and the trigger information indicates the terminal whether to determine the number of repetitions of the SRS and/or the PUSCH based on the valid value of the MCS index. For example, when a value of dynamic repetition is 1, it is used to trigger the terminal to determine the number of repetitions of the SRS and/or the PUSCH based on the valid value of the MCS index. When the value of dynamic repetition is 0, it indicates that the terminal does not determine the number of repetitions of the SRS and/or the PUSCH based on the valid MCS value.

In another example, alternatively, when determining that the number of repetitions of the SRS and/or the PUSCH is not indicated by using the valid value of the MCS index, the network side device may choose not to send the trigger information to the terminal. The network side device sends the trigger information to the terminal only when determining that the terminal needs to be triggered to determine the number of repetitions of the SRS and/or the PUSCH by using the valid value of the MCS index, to implement dynamic indication and reduce resource overheads.

Specifically, the network side device sends a piece of trigger information to the terminal device, to indicate the terminal to determine a number of repetitions of an SRS and/or a PUSCH based on a valid value of an MCS index of DCI. Correspondingly, the terminal receives the trigger information sent by the network side device, and determines, based on the trigger information, that a number of repetitions of the SRS and/or the PUSCH needs to be determined based on a valid value of an MCS index of DCI sent by the network side device.

Then, the network side device sends DCI to the terminal device. After receiving the DCI sent by the network side device, the terminal determines a number, corresponding to the MCS index value of the received DCI, of repetitions of the SRS and/or the PUSCH based on a correspondence between the valid value of the MCS index and the number of repetitions of the SRS and/or the PUSCH.

It should be noted that, the foregoing description is merely an example. In this application, a specific indication manner for determining the number of repetitions of the SRS and/or the PUSCH by the network side device and the terminal may be defined in a protocol, or configured by the network side device for the terminal, for example, configured by the network side device in a communication process by using higher layer signaling or physical layer signaling. For example, the network side device sends indication manner configuration information to the terminal by using RRC signaling, and the terminal determines, based on the configuration information, a specific DCI indication manner, for example, a manner of indicating the number of repetitions of the SRS and/or the PUSCH by using the valid value of the MCS index, or a manner of indicating the number of repetitions of the SRS and/or the PUSCH by using the redundant value of the MCS index. Optionally, when the number of repetitions of the SRS and/or the PUSCH is indicated by using the redundant value of the MCS index, the network side device may not send the trigger signaling.

If the first indication information is an MCS index value, when the MCS index value is a redundant value of the MCS index, the network side device may not perform triggering by using additional signaling. When the terminal receives the DCI and determines that the MCS index in the DCI is a redundant value, the terminal may determine the number of repetitions of the SRS and/or the PUSCH based on the redundant MCS index value.

Implementation 2: An extension field of the DCI indicates the number of repetitions of the SRS and/or the PUSCH.

Specifically, the network side device sends DCI to the terminal, the DCI includes first indication information, and the first indication information may be carried in an extension field in the DCI. Correspondingly, the terminal receives the DCI from the network side device, and determines a number of repetitions of an SRS and/or a PUSCH based on the first indication information carried in the extension field in the DCI.

When the number of repetitions of the SRS and/or the PUSCH is indicated by using the extension field in the DCI, an indication manner is explicitly indicating the number of repetitions of the SRS and/or the PUSCH by using the extension field. For example, when a value of the first indication information carried in the extension field is 1, it indicates that the number of repetitions of the SRS and/or the PUSCH is 1. For another example, when the value of the first indication information is 2, it indicates that the number of repetitions of the SRS and/or the PUSCH is 2. That is, the number of repetitions of the SRS and/or the PUSCH is determined based on a value of the extension field in the DCI.

Another indication manner is implicitly indicating the number of repetitions of the SRS and/or the PUSCH by using the extension field. For example, the first indication information carried in the extension field is a value index of the number of repetitions of the SRS and/or the PUSCH, and based on a correspondence between different value indexes and numbers of repetitions of the SRS and/or the PUSCH, it is determined that a value of the extension field in the DCI sent by the network side device is an index value corresponding to the number of repetitions of the SRS and/or the PUSCH.

Optionally, when a number of repetitions of the SRS and/or the PUSCH is indicated by using the DCI, that is, in the implementation 1 and the implementation 2, the network side device may not configure, for the terminal, RRC signaling used to indicate a number of repetitions of the SRS and/or the PUSCH, or the terminal may choose not to receive the RRC signaling used to indicate a number of repetitions of the SRS and/or the PUSCH.

Implementation 3: RRC signaling and DCI are jointly used to indicate the number of repetitions of the SRS and/or the PUSCH.

Figure 3:
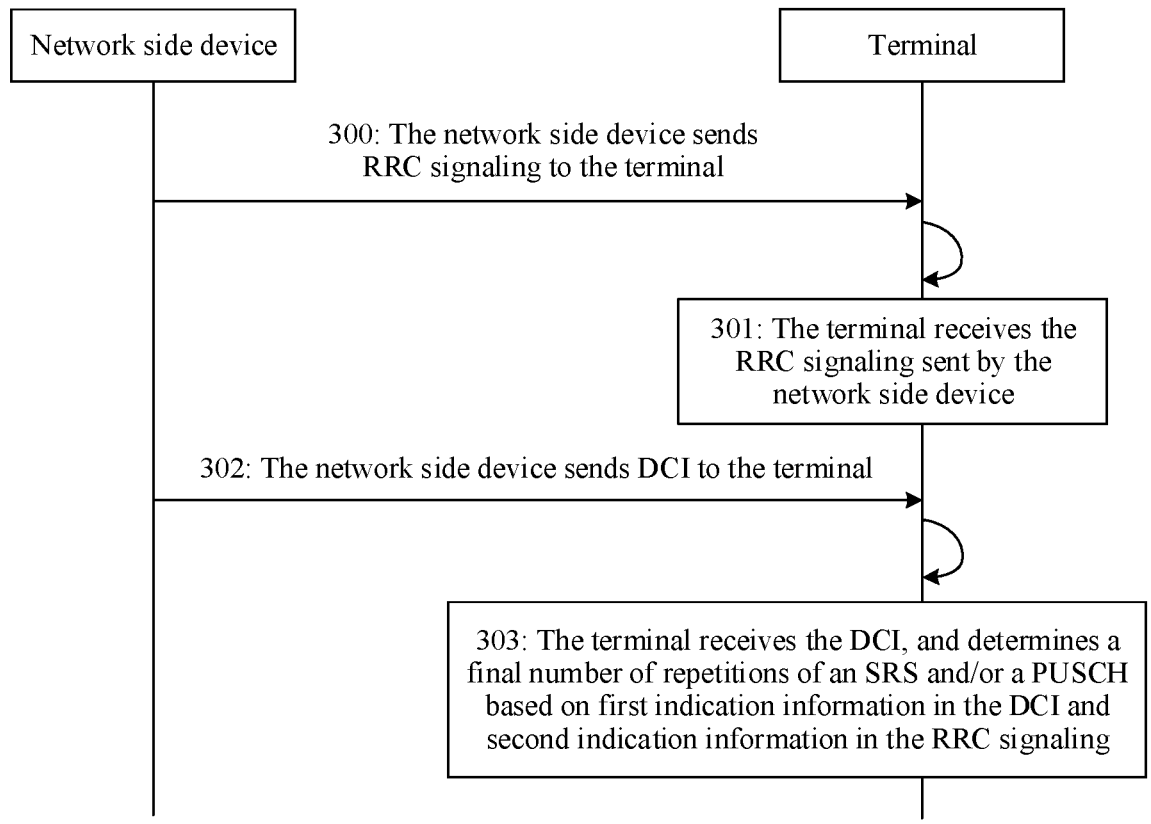
FIG. 3 is a schematic diagram of an interaction procedure of indicating a number of repetitions according to an embodiment of this application.

In an optional scenario, the network side device may jointly indicate, by using RRC signaling and DCI, a number of repetitions of an SRS and/or a PUSCH. For example, FIG. 3 is a schematic diagram of an interaction procedure in which RRC signaling and DCI are jointly used for indication according to this application. The interaction procedure includes the following steps:

Step 300: The network side device sends RRC signaling to the terminal. The RRC signaling includes second indication information, and the second indication information indicates a first number of repetitions of an SRS and/or a PUSCH.

Step 301: The terminal receives the RRC signaling sent by the network side device, and determines the first number of repetitions of the SRS and/or the PUSCH based on the second indication information of the RRC signaling.

Step 302: The network side device sends DCI to the terminal. The DCI includes first indication information, and the first indication information indicates a number of repetitions of the SRS and/or the PUSCH. Alternatively, the first indication information indicates the terminal to adjust the first number, indicated by the second indication information, of repetitions of the SRS and/or the PUSCH.

Step 303: The terminal receives the DCI, and determines a final number of repetitions of the SRS and/or the PUSCH based on an adjustment value indicated by the first indication information included in the DCI and the first number, indicated by the second indication information of the RRC signaling, of repetitions of the SRS and/or the PUSCH.

Specifically, for step 302, when the number of repetitions of the SRS and/or the PUSCH is jointly indicated by using the RRC signaling and the DCI, an indication manner is indicating the adjustment value of the first number, indicated by the second indication information of the RRC signaling, of repetitions of the SRS and/or the PUSCH by using the first indication information of the DCI. For example, if the adjustment value indicated by the first indication information of the DCI is −1, the first number, indicated by the second indication information, of repetitions is decreased by 1. For another example, if the adjustment value indicated by the first indication information of the DCI is 2, the first number, indicated by the second indication information, of repetitions is increased by 2.

Another indication manner is using a selection rule corresponding to the first indication information of the DCI. After the first number, indicated by the second indication information, of repetitions of the SRS is removed from the candidate values of the number of repetitions of the SRS, a candidate value is selected from remaining candidate values based on the selection rule. Alternatively, after the first number, indicated by the second indication information, of repetitions of the PUSCH is removed from the candidate values of the number of repetitions of the PUSCH, a candidate value is selected from remaining candidate values based on the selection rule.

In a third indication manner, the network side device adds the first indication information to the subsequently delivered DCI to indicate the terminal to determine the number of repetitions of the SRS and/or the PUSCH based on the first indication information of the DCI. Correspondingly, after receiving the RRC signaling, the terminal receives the DCI, and when the first indication information of the DCI indicates the number of repetitions of the SRS and/or the PUSCH, the terminal performs a repetition based on the number, indicated by the first indication information of the DCI, of repetitions of the SRS and/or the PUSCH.

In an exemplary scenario, after sending the RRC signaling, the network side device does not send the DCI to the terminal, or the DCI sent to the terminal does not carry the first indication information. In this case, the terminal performs a repetition based on the first number, indicated by the second indication information delivered by the network side device, of repetitions of the SRS and/or the PUSCH.

It should be understood that a time interval at which the network side device delivers the RRC signaling is relatively large, for example, tens of milliseconds. During this interval, the network side device may dynamically indicate, based on a channel change by using the DCI, the terminal to adjust the first number, indicated by the second indication information, of repetitions of the SRS and/or the PUSCH, to obtain a number, adapted to a changed channel, of repetitions of the SRS and/or the PUSCH.

It should be noted that, in a first aspect, in the different implementations and the specific indication manners in the different implementations, the technical solution of indicating the number of repetitions of the SRS and/or the PUSCH by using the DCI in this application may be implemented, but which indication manner is specifically used for indication may be defined in a protocol, or preset in the network side device and the terminal, or configured by the network side device for the terminal. For example, in a communication process, the network side device sends DCI indication manner configuration information to the terminal by using high layer signaling or physical layer signaling, and the terminal determines a specific DCI indication manner based on the configuration information. In a second aspect, similarly, the correspondences in the different indication manners may be defined based on a protocol, or preset in the network side device and the terminal, or may be configured by the network side device for the terminal by using high layer signaling. This is not limited in this embodiment of this application.

The foregoing describes several implementations of indicating the number of repetitions of the SRS and/or the PUSCH by using the DCI signaling in this application. Each implementation further includes different indication manners, and each indication manner forms a specific technical solution of this application. The following separately describes the indication manners in detail. Before specific technical solutions of this application are described, the MCS index is first briefly described.

The network side device adds the MCS index value to the DCI, and indicates different parameters by using the MCS index value. Correspondingly, a range of the MCS index value is determined based on a total number of states corresponding to the indicated parameters. For example, Table 1 below shows a modulation order and a code rate of the PUSCH that are indicated by using the MCS index.

TABLE 1

| MCS index value | Modulation order Qm (modulation order Qm) | Target code rate R × 1024 (target code rate) | Spectral efficiency (spectral efficiency) |
| --- | --- | --- | --- |
| 0  | q | 240/q | 0.2344 |
| 1  | q | 314/q | 0.3066 |
| 2  | 2 | 193 | 0.3770 |
| 3  | 2 | 251 | 0.4602 |
| 4  | 2 | 308 | 0.6016 |
| 5  | 2 | 379 | 0.7402 |
| 6  | 2 | 449 | 0.8770 |
| 7  | 2 | 526 | 1.0273 |
| 8  | 2 | 602 | 1.1758 |
| 9  | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 466 | 2.7305 |
| 18 | 6 | 517 | 3.0293 |
| 19 | 6 | 567 | 3.3223 |
| 20 | 6 | 616 | 3.6094 |
| 21 | 6 | 666 | 3.6023 |
| 22 | 6 | 719 | 4.2129 |
| 23 | 6 | 772 | 4.5234 |
| 24 | 6 | 822 | 4.8164 |
| 25 | 6 | 873 | 5.1152 |
| 26 | 6 | 910 | 5.3320 |
| 27 | 6 | 948 | 5.5547 |
| 28 | | Reserved (redundant) | |
| 29 | | Reserved | |
| 30 | | Reserved | |
| 31 | | Reserved | |

As shown in the foregoing table, the DCI includes 28 state values of modulation orders and code rates of the PUSCH, which correspond to MCS index values 0 to 27 one by one. In other words, the network side device indicates modulation orders and code rates of the PUSCH to the terminal by using different MCS index values.

It should be understood that, the DCI includes a plurality of bits whose values are 0 or 1. In this case, DCI used to indicate a modulation order and a code rate of the PUSCH has at least 5 bits, and a corresponding value range is 0 to 32, in which only 0 to 27 are currently used to indicate the 28 different state values of modulation orders and code rates of the PUSCH, and four MCS index values are idle (referring to MCS index values 28 to 31 in Table 1). In other words, the MCS index values 28 to 31 are not used to indicate modulation orders and code rates of the PUSCH. For ease of description, in the following, the MCS index values 0 to 27 are referred to as valid MCS index values, and the MCS index values 28 to 31 are referred to as redundant MCS index values.

In this embodiment of this application, the implementation 1 is using the MCS index to indicate the number of repetitions of the SRS and/or the PUSCH. The MCS index may have a valid MCS index value, or may have a redundant MCS index value. The following describes in detail the two indication manners in the implementation 1.

[Indication Manner 1]

The number of repetitions of the SRS and/or the PUSCH is indicated by using a valid MCS index value.

The network side device sends DCI to the terminal, the DCI includes first indication information, the first indication information is a valid MCS index value, and the valid MCS index value indicates a number of repetitions of an SRS and/or a PUSCH to the terminal. Correspondingly, the terminal receives the DCI sent by the network side device, and determines a number, corresponding to the valid MCS index value included in the received DCI, of repetitions of the SRS and/or the PUSCH based on a preset correspondence between the valid MCS index value and the number of repetitions of the SRS and/or the PUSCH.

Specifically, in this embodiment of this application, the number of repetitions of the SRS may be indicated by using a valid MCS index value, or the number of repetitions of the PUSCH may be indicated by using a valid MCS index value, or the numbers of repetitions of the SRS and the PUSCH may be indicated by using a valid MCS index value. Specific examples are as follows.

Example 1: The number of repetitions of the SRS is indicated by using a valid MCS index value.

The network side device sends DCI to the terminal device, the DCI includes first indication information, the first indication information indicates a number of repetitions of an SRS to the terminal, and the first indication information may be an MCS index value. Correspondingly, after receiving the DCI sent by the network side device, the terminal determines a number, corresponding to the MCS index value included in the received DCI, of repetitions of the SRS based on a correspondence between the MCS index value and the number of repetitions of the SRS.

Specifically, when the number of repetitions of the SRS is indicated by using the valid MCS index value, the number may be determined based on a modulation order indicated by the current MCS index. For example, when the modulation order indicated by the MCS index value is 2, it indicates that a channel condition of a PUSCH is poor. In this case, a low-order modulation mode (that is, a small modulation order) is recommended to ensure demodulation performance. Therefore, to ensure uplink transmission of the SRS and the PUSCH, when the channel condition is poor, the numbers of repetitions of the SRS and/or the PUSCH may be relatively large. When the modulation order indicated by the MCS index value is 4, it indicates that the channel condition is good. Therefore, the numbers of repetitions of the SRS and the PUSCH may be appropriately reduced. When the modulation order indicated by the MCS index value is 6, it indicates that the channel condition is very good. In this case, a higher-order modulation mode may be used to achieve higher spectral efficiency. Therefore, the numbers of repetitions of the SRS and the PUSCH may be further reduced.

In conclusion, the correspondence between the valid MCS index value and the number of repetitions of the SRS may be shown in Table 2 below.

TABLE 2

| Valid MCS index value | Number of repetitions of the SRS |
| --- | --- |
| 0-9 | 4 |
| 10-16 | 2 |
| 17-27 | 1 |

Alternatively, a correspondence preset in the terminal is shown in Table 3 below.

TABLE 3

| Modulation order | Number of repetitions of the SRS |
|---|---|
| 2 | 4 |
| 4 | 2 |
| 6 | 1 |

That is, the terminal may first determine, based on the MCS index value, a modulation order indicated by the MCS index value, and then determine a number, corresponding to the modulation order indicated by the MCS index value, of repetitions of the SRS based on a correspondence between the modulation order and the number of repetitions of the SRS. For example, Table 2 is used as an example. Assuming that the MCS index value included in the DCI that is sent by the network side device and that is received by the terminal is 11, the terminal determines, based on the correspondence shown in Table 2, that a number, corresponding to the MCS index value 11, of repetitions of the SRS is 2. Then, the terminal transmits the SRS based on the determined number of repetitions of the SRS.

Example 2: The number of repetitions of the PUSCH is indicated by using a valid MCS index value.

The network side device sends DCI to the terminal device, the DCI includes first indication information, the first indication information indicates a number of repetitions of a PUSCH to the terminal, and the first indication information may be an MCS index value.

Correspondingly, after receiving the DCI sent by the network side device, the terminal determines a number, corresponding to the MCS index value included in the received DCI, of repetitions of the PUSCH based on a correspondence between the MCS index value and the number of repetitions of the PUSCH.

For a specific manner of indicating the number of repetitions of the PUSCH by using a valid MCS index value in this application, refer to the specific description of the manner of indicating the number of repetitions of the SRS by using a valid MCS index value. Details are not described herein again.

It should be noted that a PUSCH candidate value is different from an SRS candidate value. As described above, the PUSCH candidate values are {1, 2, 4, 8}. Therefore, when the number of repetitions of the SRS is indicated above, three states of the SRS candidate value are indicated by using the MCS index value. When the number of repetitions of the PUSCH is indicated by using the MCS index value, four states of the PUSCH need to be indicated by using the MCS index value.

Table 4 below shows a specific example of the correspondence between the valid MCS index value and the number of repetitions of the PUSCH.

TABLE 4

| Valid MCS index value | Number of repetitions of the PUSCH |
|---|---|
| 0-6 | 8 |
| 7-13 | 4 |
| 14-20 | 2 |
| 21-27 | 1 |

It should be noted that, values in correspondences described above and below are merely examples. In this embodiment of this application, specific values of the MCS index value and the numbers of repetitions of the SRS and the PUSCH are not limited.

Example 3: The numbers of repetitions of the SRS and the PUSCH are both indicated by using a valid MCS index value.

The network side device sends DCI to the terminal device, the DCI includes first indication information, the first indication information indicates a number of repetitions of an SRS and a number of repetitions of a PUSCH to the terminal, and the first indication information may be an MCS index value.

Correspondingly, after receiving the DCI sent by the network side device, the terminal determines a number, corresponding to the MCS index value included in the received DCI, of repetitions of the SRS based on a correspondence between the MCS index value and the number of repetitions of the SRS, and determines a number, corresponding to the MCS index value included in the same received DCI, of repetitions of the PUSCH based on a correspondence between the MCS index value and the number of repetitions of the PUSCH.

When the numbers of repetitions of the SRS and the PUSCH are both indicated by using the valid MCS index value, forms of the correspondence between the MCS index value and the number of repetitions of the SRS and the correspondence between the MCS index value and the number of repetitions of the PUSCH may be two independent tables (for example, forms of Table 2 and Table 4 above), or may be a same table, as shown in Table 5 below.

TABLE 5

| Valid MCS index value | Number of repetitions of the SRS | Number of repetitions of the PUSCH |
|---|---|---|
| 0-6 | 4 | 8 |
| 6-9 | 4 | 4 |
| 10-13 | 2 | 4 |
| 14-16 | 2 | 2 |
| 17-20 | 1 | 2 |
| 21-27 | 1 | 1 |

[Indication Manner 2]

The number of repetitions of the SRS and/or the number of repetitions of the PUSCH is indicated by using a redundant MCS index value.

When the number of repetitions of the SRS and/or the number of repetitions of the PUSCH is indicated by using the redundant MCS index value, optionally, the network side device may not perform triggering by using additional signaling. After receiving the DCI, the terminal may determine the number of repetitions of the SRS and/or the number of repetitions of the PUSCH based on the redundant MCS index value.

Similarly, in this embodiment of this application, the number of repetitions of the SRS may be indicated by using a redundant MCS index value, or the number of repetitions of the PUSCH may be indicated by using a redundant MCS index value, or the numbers of repetitions of the SRS and the PUSCH may be indicated by using a redundant MCS index value. Specific examples are as follows.

Example 1: The number of repetitions of the SRS is indicated by using a redundant MCS index value.

The network side device sends DCI to the terminal device, the DCI includes first indication information, the first indication information indicates a number of repetitions of an SRS to the terminal, and the first indication information may be a redundant MCS index value.

Correspondingly, after receiving the DCI sent by the network side device, the terminal determines a number, corresponding to the redundant MCS index value included in the received DCI, of repetitions of the SRS based on a correspondence between the redundant MCS index value and the number of repetitions of the SRS.

Specifically, it can be learned from Table 1 above that the redundant MCS index value includes 28 to 31, and the SRS candidate values are {1, 2, 4}. Therefore, when the number of repetitions of the SRS is indicated by using the redundant MCS index value, three index values may be selected from the redundant MCS index values 28 to 31 to indicate the SRS candidate values. For example, the first three index values are selected in descending order or ascending order of the redundant MCS index values. Alternatively, three values are randomly selected from the redundant MCS index values 28 to 31 to indicate numbers of repetitions of the SRS. For example, 28 to 30 are selected to indicate different numbers of repetitions of the SRS. Table 6 below shows a specific example of a correspondence between the redundant MCS index values 28 to 30 and the numbers of repetitions of the SRS.

TABLE 6

| Redundant MCS index value | Number of repetitions of the SRS |
| --- | --- |
| 28 | 1 |
| 29 | 2 |
| 30 | 4 |

Table 6 is used as an example. Assuming that the MCS index value included in the DCI that is sent by the network side device and that is received by the terminal is 29, the terminal determines, based on the correspondence shown in Table 6, that a number, corresponding to the MCS index value 29, of repetitions of the SRS is 2. Then, the terminal repeats the SRS based on the determined number 2 of repetitions of the SRS.

Example 2: The number of repetitions of the PUSCH is indicated by using a redundant MCS index value.

The network side device sends DCI to the terminal device, the DCI includes first indication information, the first indication information indicates a number of repetitions of a PUSCH to the terminal, and the first indication information may be a redundant MCS index value.

Correspondingly, after receiving the DCI sent by the network side device, the terminal determines a number, corresponding to the redundant MCS index value included in the received DCI, of repetitions of the PUSCH based on a correspondence between the redundant MCS index value and the number of repetitions of the PUSCH.

Table 7 below shows a specific example of the correspondence between the redundant MCS index value and the number of repetitions of the PUSCH.

TABLE 7

| Redundant MCS index value | Number of repetitions of the PUSCH |
| --- | --- |
| 28 | 8 |
| 29 | 4 |
| 30 | 2 |
| 31 | 1 |

Example 3: The numbers of repetitions of the SRS and the PUSCH are both indicated by using a redundant MCS index value.

For a specific manner of indicating the number of repetitions of the SRS and the number of repetitions of the PUSCH by using the redundant MCS index value, refer to the specific description of the third example in the indication manner 1. Details are not described herein again. Table 8 below shows a specific example of a correspondence between the redundant MCS index value and the numbers of repetitions of the SRS and the PUSCH according to this application.

TABLE 8

| Redundant MCS index value | Number of repetitions of the SRS | Number of repetitions of the PUSCH |
| --- | --- | --- |
| 28 | 1 | 1 |
| 29 | 2 | 2 |
| 30 | 4 | 4 |
| 31 | — | 8 |

The redundant MCS index value 31 may not be used to indicate the number of repetitions of the SRS, or may be used to indicate one of the SRS candidate values, for example, indicate 4. In other words, the redundant MCS index values 30 and 31 are both used to indicate that the number of repetitions of the SRS is 4.

If the redundant MCS index value 31 is not used to indicate the number of repetitions of the SRS, the terminal may obtain the number of repetitions of the SRS in another manner, for example, by using RRC signaling or a manner described in another implementation of this application. Alternatively, the terminal infers that current channel quality is poor based on the number of repetitions of the PUSCH, and determines that the number of repetitions of the SRS increases correspondingly, for example, determines that the number of repetitions of the SRS is 4.

In the foregoing, different numbers of repetitions of the SRS and/or the PUSCH are indicated by using an existing field (MCS index) in the DCI. In this application, an extension field in the DCI may alternatively be used. For example, 2 bits are added to the DCI, to indicate the number of repetitions of the SRS and/or the PUSCH. The following describes, by using the implementation 2, specific manners of indicating the number of repetitions of the SRS and/or the PUSCH by using the extension field of the DCI.

The foregoing specifically describes the indication manners included in the implementation 1, and the following specifically describes the indication manners included in the implementation 2.

[Indication Manner 3]

The number of repetitions of the SRS and/or the number of repetitions of the PUSCH is directly indicated by using a value of the first indication information carried in the extension field in the DCI.

The network side device sends DCI to the terminal, the DCI includes first indication information, and the first indication information is carried in an extension field of the DCI, to indicate the terminal to determine a number of repetitions of an SRS and/or a PUSCH based on the first indication information. Correspondingly, the terminal receives the DCI sent by the network side device, and determines the number of repetitions of the SRS and/or the PUSCH based on the value of the first indication information carried in the extension field in the DCI.

Similarly, in this embodiment of this application, the number of repetitions of the SRS may be directly indicated by using a value of the first indication information, or the number of repetitions of the PUSCH may be directly indicated by using a value of the first indication information, or the number of repetitions of the SRS and the number of repetitions of the PUSCH may be directly indicated by using a value of the first indication information. Specific examples are as follows.

Example 1: The value of the first indication information carried in the extension field of the DCI is a value of the indicated number of repetitions of the SRS.

Specifically, the extension field may be a newly added bit field in the DCI, and a value (decimal value) of a bit (0 or 1) of the first indication information carried in the extension field indicates the number of repetitions of the SRS.

Because the SRS candidate values are {1, 2, 4}, when the number of repetitions of the SRS is indicated by using the value of the bit of the first indication information, the first indication information has at least 1 bit, and a number of bits of the first indication information may be flexibly adjusted based on the indicated number of repetitions of the SRS. For example, when the value of the bit of the first indication information is 1, it indicates that the number of repetitions of the SRS is 1. For another example, when the value of the bit of the first indication information is 2, it indicates that the number of repetitions of the SRS is 2. For another example, when the value of the bit of the first indication information is 4, it indicates that the number of repetitions of the SRS is 4.

After receiving the DCI sent by the network side device, the terminal determines, based on the value of the first indication information carried in the extension field of the DCI, the number of repetitions of the SRS, and repeats the SRS based on the determined number of repetitions of the SRS.

It should be noted that, in this embodiment of this application, when the first indication information is carried in the extension field of the DCI, a number of bits of the extension field may be fixed, or may be flexibly changed based on an indication value corresponding to the first indication information, which are separately described below.

(1) The number of bits of the extension field is fixed. For example, when the SRS candidate values {1, 2, 4} are respectively indicated by using values of the first indication information of the DCI, correspondingly, values of the extension field are respectively 1, 2, and 4. For example, when the value of the extension field is 1, the extension field has at least 1 bit. Assuming that the extension field has 1 bit, a bit value of the bit is 1. Assuming that the extension field has 2 bits, a bit value of the 2 bits is 01 or the like. For another example, when the value of the extension field is 4, the extension field has at least 3 bits. Assuming that the extension field has 3 bits, a bit value of the 3 bits is 100. Assuming that the extension field has 4 bits, a bit value of the 4 bits is 0100 or the like. In this case, when the number of repetitions of the SRS is indicated by using an extension field with a fixed number of bits, it is determined, based on a maximum value 4 that needs to be obtained, that a minimum number of bits in the extension field is 3. That is, when a bitmap of the extension field is 001, it indicates that the number of repetitions of the SRS is 1. When the bitmap of the extension field is 010, it indicates that the number of repetitions of the SRS is 2. When the bitmap of the extension field is 100, it indicates that the number of repetitions of the SRS is 4.

In the foregoing manner, because the extension field has a fixed number of bits, that is, the DCI including the first indication information is in a fixed format, complexity is low when the terminal blindly detects DCI, while resource overheads may increase when the indicated number of repetitions of the SRS is 1 or 2.

(2) The number of bits of the extension field is a variable value. For example, the number of repetitions of the SRS is indicated by using a value of the extension field of the DCI. When the indicated number of repetitions of the SRS is 1, a bitmap of the extension field in the DCI is 1. When the indicated number of repetitions of the SRS is 2, the bitmap of the extension field in the DCI is 10. When the indicated number of repetitions of the SRS is 4, the bitmap of the extension field in the DCI is 100.

In the foregoing manner, it is clear that a smaller number of bits of the first indication information indicates a smaller number of DCI resources occupied by the first indication information. When a number of repetitions is indicated by using the flexible extension field, resource overheads can be reduced, but when a different number of repetitions is indicated, a DCI format may change, which increases complexity when the UE blindly detects DCI.

In the following, when the first indication information is carried in the extension field, the number of bits of the extension field may be fixed or flexibly changed. In addition, for manners of determining the number of bits of the extension field in different manners, refer to the foregoing specific description. Similar situations below are not described again.

Example 2: The value of the first indication information carried in the extension field of the DCI is a value of the indicated number of repetitions of the PUSCH.

In this example, after receiving the DCI sent by the network side device, the terminal determines, based on a value of a bit of the first indication information carried in the extension field of the DCI, the number of repetitions of the PUSCH, and repeats the PUSCH based on the determined number of repetitions of the PUSCH.

For a specific manner of directly indicating the number of repetitions of the PUSCH by using the value of the first indication information carried in the extension field of the DCI, refer to the specific description of the first example in the indication manner 3. Details are not described herein again.

Example 3: The numbers of repetitions of the SRS and the PUSCH are both indicated by using a value of the first indication information carried in the extension field of the DCI.

In this example, the terminal determines the number of repetitions of the SRS and the number of repetitions of the PUSCH based on the value of the first indication information in the received DCI of the network side device. For example, when a value of a bit of the first indication information is 1, it indicates that both the number of repetitions of the SRS and the number of repetitions of the PUSCH are 1. For another example, when the value of the bit corresponding to the first indication information is 2, it indicates that both the number of repetitions of the SRS and the number of repetitions of the PUSCH are 2. For another example, when the value of the bit corresponding to the first indication information is 4, it indicates that both the number of repetitions of the SRS and the number of repetitions of the PUSCH are 4. For another example, when the value of the bit corresponding to the first indication information is 8, it indicates that the number of repetitions of the PUSCH is 8. Because the SRS candidate values are {1, 2, 4}, when the value of the bit corresponding to the first indication information is 8, the value may not be used to indicate the number of repetitions of the SRS, or the terminal selects a number 4, that is close to the value of the first indication information, of repetitions as a determined number of repetitions of the SRS. Alternatively, another manner described in this application may be used for determining. This is not limited in this application.

[Indication Manner 4]

The number of repetitions of the SRS and/or the number of repetitions of the PUSCH is implicitly indicated by using a value index, carried by the first indication information carried in the extension field of the DCI, of the number of repetitions of the SRS and/or the PUSCH.

The network side device sends DCI to the terminal, the DCI includes first indication information, and the first indication information may be carried in an extension field of the DCI, to indicate a number of repetitions of an SRS and/or a PUSCH. Correspondingly, the terminal receives the DCI sent by the network side device, and determines a number, corresponding to the first indication information included in the received DCI, of repetitions of the SRS and/or the PUSCH based on a correspondence between the first indication information and the number of repetitions of the SRS and/or the PUSCH.

Similarly, in this application, the number of repetitions of the SRS may be implicitly indicated by using the first indication information, or the number of repetitions of the PUSCH may be implicitly indicated by using the first indication information, or the number of repetitions of the SRS and the number of repetitions of the PUSCH may be both implicitly indicated by using the first indication information. Specific examples are as follows.

Example 1: The number of repetitions of the SRS is implicitly indicated by using a value index of the first indication information carried in the extension field of the DCI.

For example, SRS candidate values are {1, 2, 4}. It is assumed that the first indication information has 2 bits, and different values of the 2 bits correspond to different numbers of repetitions of the SRS. Table 9 below shows a correspondence between value indexes of the first indication information carried in the extension field and numbers of repetitions of the SRS according to this application.

TABLE 9

| First indication information (2 bits) | Number of repetitions of the SRS |
| --- | --- |
| 00 | 1 |
| 01 | 2 |
| 10 | 4 |
| 11 | — |

Correspondingly, after receiving the DCI sent by the network side device, the terminal determines a number, corresponding to a bit value of the bits of the first indication information in the received DCI, of repetitions of the SRS based on a preset correspondence between the first indication information and the number of repetitions of the SRS. For example, Table 9 is used as an example. If the bit value of the bits of the first indication information of the DCI that is sent by the network side device and that is received by the terminal is 01, the terminal determines, based on the correspondence shown in Table 9, that a number, corresponding to the bit value 01, of repetitions of the SRS is 2. That is, the terminal determines that the number of repetitions of the SRS is 2.

Example 2: The number of repetitions of the PUSCH is implicitly indicated by using a value index of the first indication information carried in the extension field of the DCI.

For example, candidate values of the number of repetitions of the PUSCH are {1, 2, 4, 8}. It is assumed that the first indication information has 2 bits, and different values of the 2 bits correspond to different numbers of repetitions of the PUSCH. Table 10 below shows a correspondence between value indexes of the first indication information carried in the extension field and numbers of repetitions of the PUSCH according to this application.

TABLE 10

| First indication information (2 bits) | Number of repetitions of the PUSCH |
| --- | --- |
| 00 | 1 |
| 01 | 2 |
| 10 | 4 |
| 11 | 8 |

Correspondingly, after receiving the DCI sent by the network side device, the terminal determines, based on a pre-defined correspondence between the value index of the first indication information and the number of repetitions of the PUSCH, a number, corresponding to a bit value of the bits of the first indication information in the received DCI, of repetitions of the PUSCH.

Example 3: The number of repetitions of the SRS and the number of repetitions of the PUSCH are both implicitly indicated by using a value index of the first indication information carried in the extension field in the DCI.

Table 11 below shows a correspondence between a value index of the first indication information carried in the extension field and a number of repetitions of the SRS as well as a number of repetitions of the PUSCH according to an embodiment of this application.

TABLE 11

| First indication information (2 bits) | Number of repetitions of the SRS | Number of repetitions of the PUSCH |
| --- | --- | --- |
| 00 | 1 | 1 |
| 01 | 2 | 2 |
| 10 | 4 | 4 |
| 11 | — | 8 |

Correspondingly, after receiving the DCI sent by the network side device, the terminal determines, based on a pre-defined correspondence between the value index of the first indication information and the number of repetitions of the SRS and correspondence between the value index of the first indication information and the number of repetitions of the PUSCH, a number of repetitions of the SRS and a number of repetitions of the PUSCH that correspond to a bit value of the bits of the first indication information in the received DCI.

It should be noted that Table 11 above is merely an example. When the number of repetitions of the SRS and the number of repetitions of the PUSCH are both indicated by using the DCI, the correspondence between the first indication information in the DCI and the number of repetitions of the SRS and the correspondence between the first indication information in the DCI and the number of repetitions of the PUSCH may be placed in a same carrier or in different carriers. For example, the carrier is in a form of a table. In this case, the correspondence between the first indication information and the number of repetitions of the SRS and the correspondence between the first indication information and the number of repetitions of the PUSCH are placed in a same table, as shown in Table 11. Alternatively, the correspondence between the first indication information and the number of repetitions of the SRS and the correspondence between the first indication information and the number of repetitions of the PUSCH are placed in different tables, as shown in Table 9 and Table 10. This is not limited in this application. A similar manner below is not described in detail again. In addition, when the bit value of the first indication information carried in the extension field is 11, the bit value may not be used to indicate the number of repetitions of the SRS, or may be used to indicate that the number of repetitions of the SRS is any one of 1, 2, and 4, for example, 4.

The following describes the indication manners included in the implementation 3.

[Indication Manner 5]

The first number, indicated by the second indication information in the RRC signaling, of repetitions of the SRS and/or the PUSCH is adjusted by using the adjustment value indicated by the first indication information of the DCI.

The network side device sends RRC signaling to the terminal, and the RRC signaling includes a first number of repetitions of an SRS and/or a PUSCH. In addition, the network side device indicates, by using first indication information in DCI, the terminal to adjust the first number, indicated by the second indication information, of repetitions of the SRS and/or the PUSCH. The first indication information may be carried in an extension field or by a redundant MCS index value in the DCI.

Correspondingly, the terminal receives the RRC signaling and the DCI that are sent by the network side device, and determines, based on a preset correspondence between first indication information and different adjustment values, an adjustment value corresponding to the first indication information in the DCI. The terminal adjusts the first number, indicated in the RRC signaling, of repetitions of the SRS and/or the PUSCH based on the adjustment value, to determine a final number of repetitions of the SRS and/or the PUSCH. For example, the terminal increases or decreases, based on the adjustment value indicated by the first indication information, the first number, indicated by the second indication information in the RRC signaling, of repetitions of the SRS and/or the PUSCH by the adjustment value indicated by the first indication information, and determines a final number of repetitions of the SRS and/or the PUSCH based on an adjusted value.

Similarly, in this embodiment of this application, an adjustment value for adjusting the first number of repetitions of the SRS may be indicated by using the first indication information, an adjustment value for adjusting the first number of repetitions of the PUSCH may be indicated by using the first indication information, or adjustment values for adjusting the first numbers of repetitions of the SRS and the PUSCH may be indicated by using the first indication information. Specific examples are as follows.

Example 1: The adjustment value for adjusting the first number of repetitions of the SRS (referred to as an SRS adjustment value for short below) is indicated by using the first indication information in the DCI.

Specifically, the first indication information is an indication value, and there is a correspondence between the indication value and the adjustment value. The first indication information has at least 2 bits. The following uses 2 bits as an example to describe the correspondence between the indication value of the first indication information and the adjustment value. Assuming that the first indication information has at least 2 bits, the first indication information may be carried in an extension field of the DCI. Table 12 below shows an example of the correspondence between the indication value of the first indication information and the adjustment value according to this application.

TABLE 12

| First indication information (2 bits) | SRS adjustment value |
| --- | --- |
| 00 | −2 |
| 01 | −1 |
| 10 | 1 |
| 11 | 2 |

Alternatively, the first indication information may be a redundant MCS index value. Table 13 below shows a specific example of a correspondence between the redundant MCS index value and the SRS adjustment value according to this application.

TABLE 13

| Redundant MCS index value | SRS adjustment value |
| --- | --- |
| 28 | −2 |
| 29 | −1 |
| 30 | 1 |
| 31 | 2 |

Correspondingly, after receiving the RRC signaling and the DCI that are sent by the network side device, the terminal adjusts the first number, indicated by the second indication information, of repetitions of the SRS based on the adjustment value indicated by the first indication information in the DCI, to determine a final number of repetitions of the SRS. The following describes an adjustment process by using an example.

Table 12 is used as an example. Assuming that the first number, indicated by the second indication information in the RRC signaling received by the terminal, of repetitions of the SRS is 4, and the indication value of the first indication information of the DCI is 00, the terminal determines, based on the correspondence shown in Table 12, that the adjustment value corresponding to the first indication information is −2. Then, the terminal adjusts the first number 4, indicated by the second indication information, of repetitions of the SRS based on the adjustment value −2. An adjusted number of repetitions of the SRS is 4−2=2.

It should be noted that, if the adjusted number of repetitions of the SRS is a value in the candidate values, the terminal determines the adjusted number of repetitions of the SRS as a final number of repetitions of the SRS. If the adjusted number of repetitions of the SRS is not a candidate value, the terminal further needs to select a value from the SRS candidate values based on the adjusted number of repetitions of the SRS as a final number of repetitions of the SRS.

For example, Table 12 is still used as an example. Assuming that the first number, indicated by the second indication information in the RRC signaling received by the terminal, of repetitions of the SRS is 4, and the indication value of the first indication information of the DCI is 01, the terminal determines, based on the correspondence shown in Table 12, that the adjustment value corresponding to the first indication information is −1. Then, the terminal adjusts the first number 4, indicated by the second indication information, of repetitions of the SRS based on the adjustment value −1. An adjusted number of repetitions of the SRS is 4−1=3.

Because the candidate values of the number of repetitions of the SRS are {1, 2, 4}, while the adjusted number of repetitions of the SRS is 3, which is not a candidate value, the terminal further needs to select a value from the SRS candidate values based on the adjusted number of repetitions of the SRS as a final number of repetitions of the SRS. There are a plurality of selection manners, and two are listed below.

Selection Manner 1: Downward Selection

That is, a candidate value that is adjacent to the adjusted number of repetitions of the SRS and is less than the adjusted number of repetitions of the SRS is selected from the candidate values as a final number of repetitions of the SRS.

For example, the adjusted number of repetitions of the SRS is 3. In this case, a candidate value 2 that is adjacent to the adjusted number 3 of repetitions of the SRS and is less than 3 is selected from the candidate values {1, 2, 4} in the downward selection manner as a final number of repetitions of the SRS.

Selection Manner 2: Upward Selection

That is, a candidate value that is adjacent to the adjusted number of repetitions of the SRS and is greater than the adjusted number of repetitions of the SRS is selected from the candidate values as a final number of repetitions of the SRS.

For example, the adjusted number of repetitions of the SRS is 3. In this case, a candidate value 4 that is adjacent to the adjusted number 3 of repetitions of the SRS and is greater than 3 is selected from the candidate values {1, 2, 4} in the upward selection manner as a final number of repetitions of the SRS. It is clear that the final number 4, determined in the selection manner 2, of repetitions of the SRS is the first number 4, indicated by the second indication information in the RRC signaling, of repetitions of the SRS, which is equivalent to that no adjustment is performed. Therefore, the terminal may determine a final number of repetitions in a preset selection manner. Alternatively, a selection manner may be flexibly selected to determine a final number of repetitions.

It should be noted that, if the first indication information of the DCI is used only to indicate the adjustment value for adjusting the first number of repetitions of the SRS, the terminal adjusts only the first number, indicated by the second indication information in the RRC signaling, of repetitions of the SRS, without adjusting the first number, indicated by the second indication information, of repetitions of the PUSCH, and may repeat the PUSCH based on the first number, indicated by the second indication information, of repetitions of the PUSCH.

Example 2: The adjustment value for adjusting the first number of repetitions of the PUSCH (referred to as a PUSCH adjustment value for short below) is indicated by using the first indication information in the DCI.

For a specific manner of adjusting the first number, indicated by the second indication information in the RRC signaling, of repetitions of the PUSCH by using the adjustment value indicated by the first indication information in the DCI in this application, refer to the specific description of the example 1. Details are not described herein again.

Example 3: The adjustment values for adjusting the first number of repetitions of the SRS and the first number of repetitions of the PUSCH are indicated by using the first indication information in the DCI.

Table 14 below shows an example of a correspondence between the first indication information and the SRS adjustment value as well as the PUSCH adjustment value.

TABLE 14

| First indication information (2 bits) | SRS adjustment value | PUSCH adjustment value |
| --- | --- | --- |
| 00 | −2 | −3 |
| 01 | −1 | −2 |
| 10 | 1 | 2 |
| 11 | 2 | 3 |

It should be noted that Table 12 above is merely an example. The adjustment value of the first number of repetitions of the PUSCH and the adjustment value of the first number of repetitions of the SRS that are indicated by the first indication information may be the same or different. How the first indication information indicates the adjustment values of the two is not limited in this embodiment of this application. In addition, all the tables shown in this application are merely examples. Numbers of repetitions of the SRS and the PUSCH or SRS and PUSCH adjustment values corresponding to specific values or bit values are not limited in this application. Any manner in which different numbers of repetitions of the SRS and/or the PUSCH can be indicated by using different values is applicable to this embodiment of this application.

Correspondingly, after receiving the DCI sent by the network side device, the terminal determines, based on the correspondence between the first indication information and the SRS adjustment value, the SRS adjustment value corresponding to the first indication information in the received DCI, and obtains a final number of repetitions of SRS based on the SRS adjustment value and the first number, indicated by the second indication information in the RRC signaling, of repetitions of the SRS. For specific steps, refer to the description of the example 1. Details are not described herein again. Similarly, the terminal determines, based on the correspondence between the first indication information and the PUSCH adjustment value, the PUSCH adjustment value corresponding to the first indication information in the received DCI, and obtains a final number of repetitions of PUSCH based on the PUSCH adjustment value and the first number, indicated by the second indication information, of repetitions of the PUSCH. For specific steps, refer to the description of the example 2. Details are not described herein again.

[Indication Manner 6]

A final number of repetitions of the SRS is selected from the SRS candidate values by using the adjustment value indicated by the first indication information of the DCI and the first number, indicated by the second indication information in the RRC signaling, of repetitions of the SRS.

The network side device sends RRC signaling to the terminal, and the RRC signaling includes a first number of repetitions of an SRS and/or a PUSCH. In addition, the network side device sends DCI to the terminal, the DCI includes first indication information, and the first indication information indicates the terminal to select, from the three SRS candidate values, a candidate value other than the first number, indicated in the RRC signaling, of repetitions of the SRS as a final number of repetitions of the SRS. In other words, the first number, indicated by the second indication information, of repetitions of the SRS is removed from the SRS candidate values, and then based on the indication of the first indication information in the DCI, a candidate value is selected from two remaining SRS candidate values as a final number of repetitions of the SRS.

Correspondingly, the terminal receives the RRC signaling and the DCI that are sent by the network side device, removes the first number of repetitions of the SRS from the SRS candidate values based on the first indication information of the DCI, and selects, based on a selection rule corresponding to the first indication information, a value from the two remaining SRS candidate values as a final number of repetitions of the SRS. The terminal repeats the SRS based on the final number of repetitions of the SRS.

The first indication information may be carried in an extension field in the DCI, or the first indication information is a redundant MCS index value.

For example, if the first indication information is carried in the extension field of the DCI, the first indication information has at least 1 bit, that is, the extension field has at least 1 bit. Assuming that the first indication information is 1 bit, bit values of the bit correspond to different selection rules. For example, if the bit value of the bit is 1, a corresponding selection rule is selecting a larger value of the two remaining candidate values as a final number of repetitions of the SRS. If the bit value of the bit is 0, a selection rule is selecting a smaller value of the two remaining candidate values as a final number of repetitions of the SRS.

A process in which the terminal determines a final number of repetitions of the SRS from the SRS candidate values based on the first indication information is described below by using an example in which the extension field carries the first indication information and the first indication information has 1 bit.

For example, it is assumed that when a bit value of the bit of the first indication information of the DCI is 0, a corresponding selection rule is selecting a larger value of the two remaining candidate values as a final number of repetitions of the SRS after the first number, indicated by the second indication information in the RRC signaling, of repetitions of the SRS is removed from the three SRS candidate values. When the bit value of the bit is 1, a corresponding selection rule is selecting a smaller value of the two remaining candidate values as a final number of repetitions of the SRS after the first number, indicated by the second indication information, of repetitions of the SRS is removed from the three SRS candidate values.

The terminal receives the RRC signaling and the DCI signaling that are sent by the network side device, the number, indicated by the second indication information in the RRC signaling, of repetitions of the SRS is 2, and the bit value of the bit corresponding to the first indication information in the DCI signaling is 0. In this case, after removing 2 from the SRS candidate values {1, 2, 4}, the terminal selects a larger value 4 from {1, 4} as a final number of repetitions of the SRS. The terminal repeats the SRS based on the final number of repetitions of the SRS, that is, continuously sends four SRSs by using a same slot.

It should be noted that, the foregoing description is merely an example, but does not limit bit values corresponding to different selection rules. A same selection rule may correspond to different bit values, but different bit values of the bit correspond to different selection rules.

In another example, the first indication information may alternatively be a redundant MCS index value. For example, when the redundant MCS index value is 28, a corresponding selection rule is selecting a larger value of the two remaining candidate values as a final number of repetitions of the SRS. If the redundant MCS index value is 29, a corresponding selection rule is selecting a larger value of the two remaining candidate values as a final number of repetitions of the SRS.

Based on a same concept, in this application, a manner in which the terminal selects a final number of repetitions of the PUSCH from the PUSCH candidate values may also be indicated by using a redundant MCS index value. For example, when the redundant MCS index value is 28, it indicates the terminal to select the first value from three remaining candidate values (that is, the smallest value of the three remaining values) as a final number of repetitions of the PUSCH after the first number, indicated by the second indication information, of repetitions of the PUSCH is removed from the PUSCH candidate values {1, 2, 4, 8}. When the redundant MCS index value is 29, it indicates the terminal to select the second value from the three remaining candidate values as a final number of repetitions of the PUSCH after the first number, indicated by the second indication information, of repetitions of the PUSCH is removed from the PUSCH candidate values {1, 2, 4, 8}. When the redundant MCS index value is 30, it indicates the terminal to select the third value from the three remaining candidate values (that is, the largest value of the three remaining values) as a final number of repetitions of the PUSCH after the first number, indicated by the second indication information, of repetitions of the PUSCH is removed from the PUSCH candidate values {1, 2, 4, 8}.

Similarly, in this application, an SRS selection manner and a PUSCH selection manner may be both indicated by using a redundant MCS index value. For details, refer to the foregoing related descriptions. Details are not described herein again.

[Indication Manner 7]

When the DCI indicates a number of repetitions of the SRS and/or the PUSCH, the number, indicated in the DCI, of repetitions of the SRS and/or the PUSCH is directly used. When the DCI does not indicate a number of repetitions of the SRS and/or the PUSCH, the number, configured in the RRC, of repetitions of the SRS and/or the PUSCH is used.

Specifically, after the network side device delivers the RRC signaling to indicate the first number of repetitions of the SRS and/or the PUSCH to the terminal, when the sent DCI includes the first indication information used to indicate the number of repetitions of the SRS and/or the PUSCH, the terminal performs a repetition based on the number, indicated by the first indication information included in the DCI, of repetitions of the SRS and/or the PUSCH. For example, if the first indication information is a value index of the number of repetitions of the SRS and/or the PUSCH, the terminal determines a number, corresponding to the value index included in the DCI, of repetitions of the SRS and/or the PUSCH based on a correspondence between numbers of repetitions of the SRS and/or the PUSCH and different value indexes, and the terminal performs a repetition based on the determined number of repetitions of the SRS and/or the PUSCH.

Alternatively, after the network side device delivers the RRC signaling to indicate the first number of repetitions of the SRS and/or the PUSCH to the terminal, the subsequently delivered DCI does not include the first indication information used to indicate or adjust the number of repetitions of the SRS and/or the PUSCH, the terminal performs a repetition based on the first number, indicated by the second indication information in the RRC signaling, of repetitions of the SRS and/or the PUSCH.

It should be noted that, in the different implementations and the specific indication manners or adjustment manners in the different implementations, the technical solution of indicating the number of repetitions of the SRS and/or the PUSCH by using the DCI in this application may be implemented, but which manner is specifically used for indication may be defined in a protocol, or configured by the network side device for the terminal, for example, configured by the network side device in a communication process by using higher layer signaling or physical layer signaling. For example, the network side device sends indication manner configuration information to the terminal by using higher layer signaling or physical layer signaling, and the terminal determines, based on the configuration information, a specific implementation or a specific DCI indication manner (referring to the indication manners 1 to 7), for example, a manner of indicating the number of repetitions of the SRS and/or the PUSCH by using the first indication information of the DCI, or a manner of indicating, by using the first indication information of the DCI, to adjust the first number, indicated by the second indication information in the RRC signaling, of repetitions of the SRS and/or the PUSCH, or for another example, a manner of indicating the number of repetitions of the SRS and/or the PUSCH by using a redundant MCS index value, or a manner of indicating the number of repetitions of the SRS and/or the PUSCH by using a valid MCS index value. It should be understood that, when the terminal determines, based on the configuration information, that the number of repetitions of the SRS and/or the PUSCH is indicated by using a valid MCS index value, an effect is the same as that of the foregoing manner of indicating, to the terminal by using dynamic first indication information, that the number of repetitions of the SRS and/or the PUSCH is indicated by using a valid MCS index value. In other words, the dynamic first indication information is configured as a specific implementation of indicating the number of repetitions of the SRS and/or the PUSCH by using a valid MCS index value. It should be noted that, a configuration manner of the configuration information may be static, that is, the configuration information is configured by the network side device only once and takes effect permanently. Alternatively, the configuration manner is dynamic, that is, the configuration information may be configured by the network side device in real time.

The foregoing describes different manners in which the terminal determines the number of repetitions of the SRS and/or the PUSCH. The following describes a process in which the terminal performs a repetition based on the determined final number of repetitions of the SRS and the determined final number of repetitions of the PUSCH.

Specifically, a repetition process of the SRS is as follows.

The terminal sends the same SRS by using one, two, or four consecutive time domain symbols of the last six time domain symbols in a same slot. There is no interval between a symbol for sending the first SRS and a symbol for carrying data, and the four consecutive symbols cannot go beyond the last six symbols of the slot.

In addition, if the number of repetitions of the SRS is greater than 1, after sending the first SRS, the terminal sends a subsequent SRS by using a transmit parameter for sending the first SRS, until a number of times of sending the SRS by using the same slot reaches the determined number of repetitions of the SRS.

The transmit parameter includes, but is not limited to, transmit power, an antenna port, a beam direction, and a frequency domain resource.

For example, assuming that the terminal determines that the final number of repetitions of the SRS is 4, the terminal sends the same SRS by using four consecutive symbols in one slot that are adjacent to and behind a symbol carrying data, and the four symbols belong to the last six symbols of the slot.

The following describes a repetition process of the PUSCH.

The terminal sends the same PUSCH by using one, two, four, or eight consecutive uplink slots in a same radio frame, and if the finally determined number of repetitions of the PUSCH is greater than 1, the terminal sends a subsequent PUSCH by using a transmit parameter for sending the first PUSCH, until a number of times of sending the PUSCH by using the same radio frame reaches the determined number of repetitions of the PUSCH.

The transmit parameter includes, but is not limited to, transmit power, an antenna port, a beam direction, and a frequency domain resource.

The foregoing mainly describes solutions provided in this application from a perspective of interaction between the network device and the terminal device. It may be understood that, to implement the foregoing functions, each network element includes a corresponding hardware structure and/or a software module (or unit) for executing each function. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of technical solutions. A person skilled in the art may use different methods to implement the described functions for each particular application, but it should not be considered that the implementation goes beyond the scope of this application.

Figure 4:
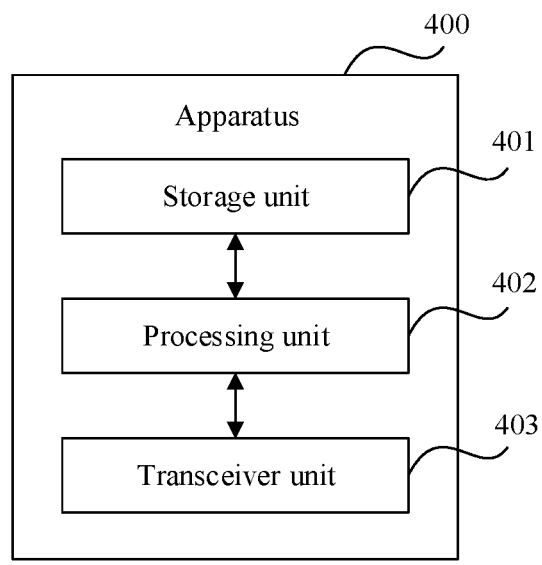
FIG. 4 is a schematic block diagram of a terminal device according to an embodiment of this application.

When an integrated unit (module) is used, FIG. 4 shows an example block diagram of a communications apparatus according to an embodiment of this application. The communications apparatus 400 may exist in a form of software. The apparatus 400 may include a processing unit 402 and a transceiver unit 403.

In an exemplary embodiment, the processing unit 402 is configured to implement a corresponding processing function. The transceiver unit 403 is configured to support communication between the apparatus 400 and another network entity. Optionally, the transceiver unit 403 may include a receiving unit and/or a sending unit, respectively configured to perform a receiving operation and a sending operation. Optionally, the apparatus 400 may further include a storage unit 401, configured to store program code and/or data of the apparatus 400.

The apparatus 400 may be the terminal device in any one of the foregoing embodiments (for example, the terminal device is the terminal device in Embodiment 1), or may be a component such as a chip disposed in the terminal device. The processing unit 402 may support the apparatus 400 in performing actions of the terminal device in the foregoing method examples. Alternatively, the processing unit 402 mainly performs internal actions of the terminal device in the method examples, and the transceiver unit 403 may support communication between the apparatus 400 and a network device.

Specifically, in an exemplary embodiment, the first indication information is carried in an existing field in the DCI, or the first indication information is carried in an extension field in the DCI, and the existing field in the DCI includes a modulation and coding scheme MCS index.

Specifically, in an exemplary embodiment, when the first indication information is an MCS index value, the processing unit 402 is specifically configured to determine a number, corresponding to the MCS index value, of repetitions of the SRS and/or the PUSCH based on a first correspondence. The first correspondence includes a correspondence between different MCS index values and different numbers of repetitions of the SRS and/or the PUSCH.

Specifically, in an exemplary embodiment, when the first indication information is carried in the extension field in the DCI, the processing unit is specifically configured to: determine the number of repetitions of the SRS and/or the PUSCH based on a value of the extension field; or determine a number, corresponding to a value index of the extension field, of repetitions of the SRS and/or the PUSCH based on a second correspondence. The second correspondence includes a correspondence between different value indexes and different numbers of repetitions of the SRS and/or the PUSCH.

Specifically, in an exemplary embodiment, when the first indication information is carried in the extension field in the DCI, the transceiver unit 403 is specifically configured to: receive radio resource control RRC signaling. The RRC signaling includes second indication information, and the second indication information indicates a first number of repetitions of the SRS and/or the PUSCH.

The processing unit 402 is specifically configured to: determine the number of repetitions of the SRS and/or the PUSCH based on the first indication information; or obtain the number of repetitions of the SRS and/or the PUSCH by using an adjustment value indicated by the first indication information and the first number of repetitions of the SRS and/or the PUSCH.

Specifically, in an exemplary embodiment, when the first indication information is an indication value, the processing unit 402 is further configured to determine, based on a third correspondence, an adjustment value corresponding to the indication value. The third correspondence is a correspondence between different indication values and different adjustment values for adjusting the number of repetitions of the SRS and/or the PUSCH.

Specifically, in an exemplary embodiment, when obtaining the number of repetitions of the SRS and/or the PUSCH by using the adjustment value indicated by the first indication information and the first number of repetitions of the SRS and/or the PUSCH, the processing unit 402 is specifically configured to: select, based on the first indication information, a candidate value from a plurality of preset candidate values except the number, indicated by the second indication information in the RRC signaling, of repetitions of the SRS, and use the selected candidate value as a determined number of repetitions of the SRS.

In an exemplary embodiment, the processing unit is specifically configured to: determine the number of repetitions of the SRS and/or the PUSCH based on a value of the extension field; or determine a number, corresponding to a value index of the extension field, of repetitions of the SRS and/or the PUSCH based on a third correspondence. The third correspondence includes a correspondence between different value indexes and different numbers of repetitions of the SRS and/or the PUSCH.

In an exemplary embodiment, the transceiver unit is further configured to: if the number of repetitions of the SRS is greater than 1, send a subsequent SRS by using a transmit parameter for sending the first SRS, until a number of times of sending the SRS by using a same slot reaches the determined number of repetitions of the SRS; or if the number of repetitions of the PUSCH is greater than 1, send a subsequent PUSCH by using a transmit parameter for sending the first PUSCH, until a number of times of sending the PUSCH by using a same radio frame reaches the determined number of repetitions of the PUSCH.

The transmit parameter includes transmit power, an antenna port, a beam direction, and a frequency domain resource.

Figure 5:
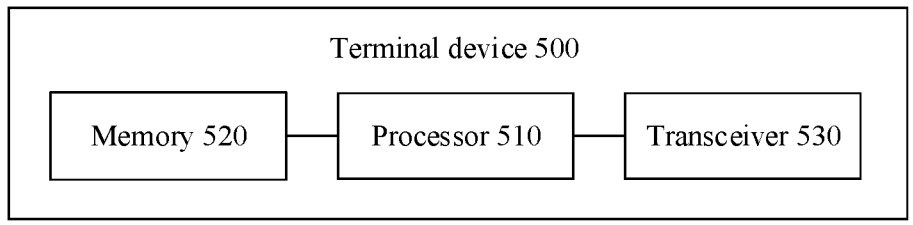
FIG. 5 is a schematic block diagram of a terminal device according to an embodiment of this application.

As shown in FIG. 5, an embodiment of this application further provides a terminal device 500. The terminal device 500 includes a processor 510, a memory 520, and a transceiver 530.

In an exemplary embodiment, the memory 520 stores instructions, a program, or data. The memory 520 may be configured to implement a function of the storage unit 401 in the foregoing embodiment. The processor 510 is configured to read the instructions, the program, or the data stored in the memory 520. When the instructions or the program stored in the memory 520 is executed, the processor 510 is configured to perform an operation performed by the processing unit 402 in the foregoing embodiment, and the transceiver 530 is configured to perform an operation performed by the transceiver unit 403 in the foregoing embodiment.

It should be understood that the apparatus 400 or the terminal device 500 in embodiments of this application may correspond to the terminal device in the communication method (FIG. 2 or FIG. 3) in embodiments of this application, and operations and/or functions of modules in the apparatus 400 or the terminal device 500 are respectively used to implement corresponding procedures of each method in FIG. 2 or FIG. 3. For brevity, details are not described herein again.

Figure 6:
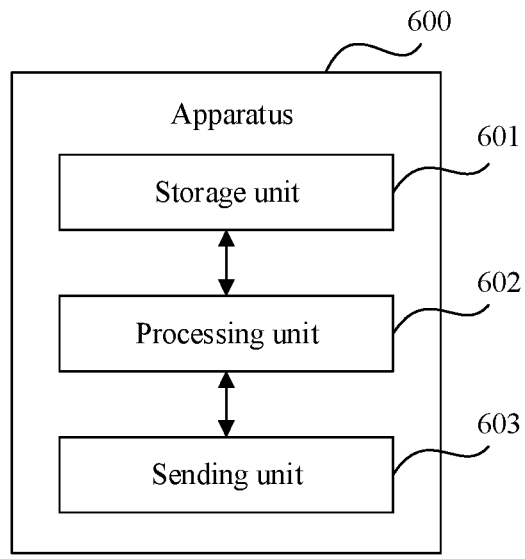
FIG. 6 is a schematic block diagram of a network device according to an embodiment of this application.

When an integrated unit (module) is used, FIG. 6 shows an example block diagram of a communications apparatus according to an embodiment of this application. The communications apparatus 600 may exist in a form of software. The apparatus 600 may include a processing unit 602 and a sending unit 603.

In an exemplary embodiment, the processing unit 602 is configured to implement a corresponding processing function. The sending unit 603 is configured to support communication between the apparatus 600 and another network entity. Optionally, the sending unit 603 may include a receiving unit and/or a transceiver unit, respectively configured to perform a receiving operation and a sending operation. Optionally, the apparatus 600 may further include a storage unit 601, configured to store program code and/or data of the apparatus 600.

The apparatus 600 may be the network device in any one of the foregoing embodiments (for example, the network device is the network device in Embodiment 1), or may be a component such as a chip disposed in the network device. The processing unit 602 may support the apparatus 600 in performing actions of the network device in the foregoing method examples. Alternatively, the processing unit 602 mainly performs internal actions of the network device in the method examples, and the sending unit 603 may support communication between the apparatus 600 and a terminal device.

Specifically, in an exemplary embodiment, the sending unit 603 sends downlink control signaling DCI to the terminal. The DCI includes first indication information, and the first indication information indicates a number of repetitions of an SRS and/or a physical uplink shared channel PUSCH.

In an exemplary embodiment, the first indication information is carried in an existing field in the DCI, or the first indication information is carried in an extension field in the DCI, and the existing field in the DCI includes a modulation and coding scheme MCS index.

In an exemplary embodiment, the first indication information is an MCS index value. The first indication information is for the terminal to determine a number, corresponding to the MCS index value, of repetitions of the SRS and/or the PUSCH based on a first correspondence. The first correspondence includes a correspondence between different MCS index values and different numbers of repetitions of the SRS and/or the PUSCH.

In an exemplary embodiment, the first indication information is carried in the extension field in the DCI. The extension field is for the terminal to determine the number of repetitions of the SRS and/or the PUSCH based on a value of the extension field. Alternatively, the extension field is for the terminal to determine a number, corresponding to a value index of the extension field, of repetitions of the SRS and/or the PUSCH based on a third correspondence. The third correspondence includes a correspondence between different value indexes and different numbers of repetitions of the SRS and/or the PUSCH.

In an exemplary embodiment, the transceiver unit is specifically configured to: send radio resource control RRC signaling to the terminal. The RRC signaling includes second indication information, and the second indication information indicates a number of repetitions of the SRS and/or the PUSCH. The first indication information indicates the number of repetitions of the SRS and/or the PUSCH. Alternatively, the first indication information indicates an adjustment value for adjusting the number, indicated by the second indication information, of repetitions of the SRS and/or the PUSCH, so that the terminal obtains the number of repetitions of the SRS and/or the PUSCH based on the adjustment value and the first number, indicated by the received second indication information, of repetitions of the SRS and/or the PUSCH.

In an exemplary embodiment, the first indication information is an indication value. The indication value is for the terminal to determine, based on a third correspondence, an adjustment value corresponding to the indication value. The third correspondence is a correspondence between different indication values and different adjustment values for adjusting the number of repetitions of the SRS and/or the PUSCH.

In an exemplary embodiment, the first indication information indicates the terminal to select a candidate value from a plurality of preset candidate values except the number, indicated by the second indication information in the RRC signaling, of repetitions of the SRS, and use the selected candidate value as a determined number of repetitions of the SRS.

Figure 7:
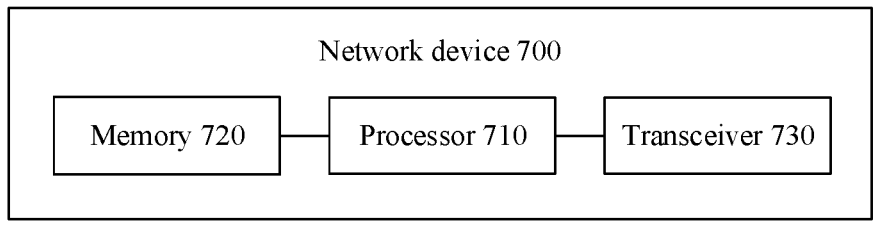
FIG. 7 is a schematic block diagram of a network device according to an embodiment of this application.

As shown in FIG. 7, an embodiment of this application further provides a network side device 700. The network side device 700 includes a processor 710, a memory 720, and a transceiver 730.

In an exemplary embodiment, the memory 720 stores instructions, a program, or data. The memory 720 may be configured to implement a function of the storage unit 601 in the foregoing embodiment. The processor 710 is configured to read the instructions, the program, or the data stored in the memory 720. When the instructions or the program stored in the memory 720 is executed, the processor 710 is configured to perform an operation performed by the processing unit 602 in the foregoing embodiment, and the transceiver 730 is configured to perform an operation performed by the sending unit 603 in the foregoing embodiment.

It should be understood that the apparatus 600 or the terminal device 700 in embodiments of this application may correspond to the network side device in the communication method (FIG. 2 or FIG. 3) in embodiments of this application, and operations and/or functions of modules in the apparatus 600 or the terminal device 700 are respectively used to implement corresponding procedures of each method in FIG. 2 or FIG. 3. For brevity, details are not described herein again.

An embodiment of this application further provides a communications apparatus. The communications apparatus may be a terminal device, or may be a circuit. The communications apparatus may be configured to perform an action performed by the terminal device in the foregoing method embodiment.

Figure 8:
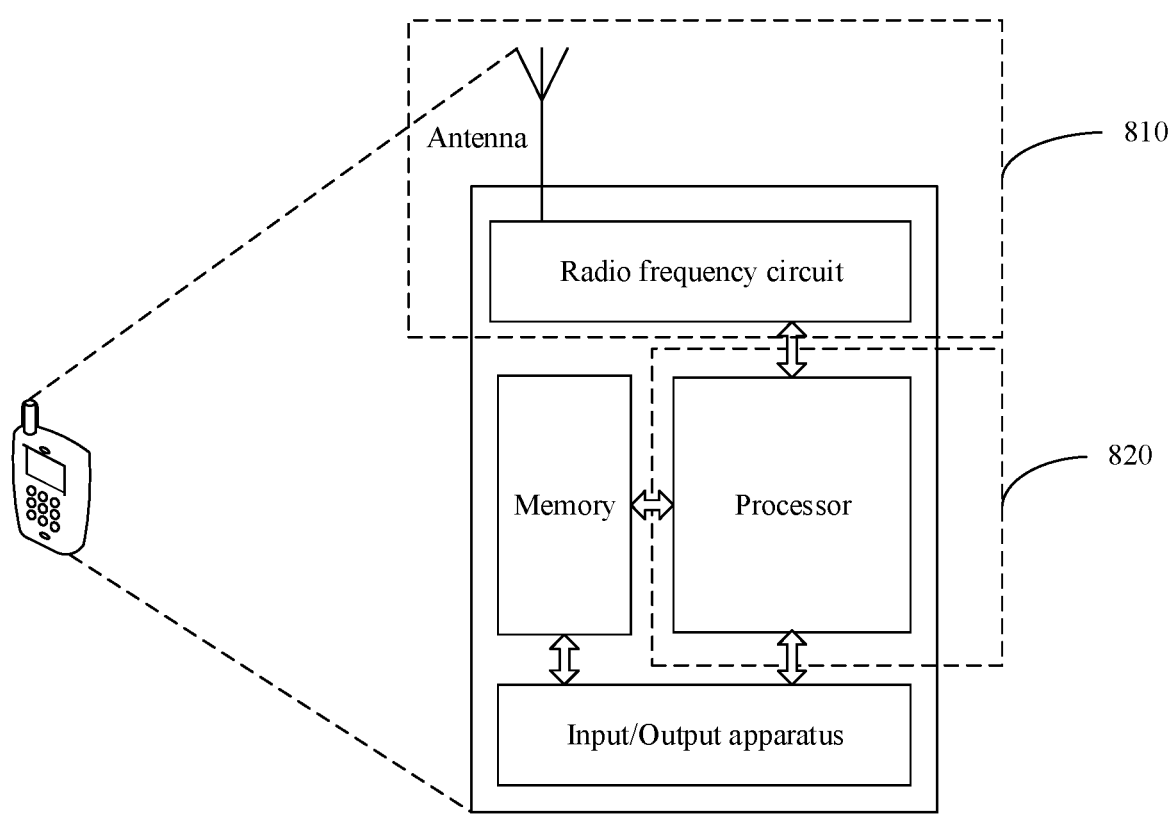
FIG. 8 is a schematic diagram of a structure of a terminal device according to an embodiment of this application.

When the communications apparatus is a terminal device, FIG. 8 is a schematic diagram of a simplified structure of a terminal device. For ease of understanding and drawing, in FIG. 8, a mobile phone is used as an example of the terminal device. As shown in FIG. 8, the terminal device includes a processor, a memory, a radio frequency circuit, an antenna, and an input/output apparatus. The processor is mainly configured to: process a communications protocol and communications data, control the terminal device, execute a software program, process data of the software program, and the like. The memory is mainly configured to store the software program and data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to: receive data input by a user and output data to a user. It should be noted that some types of terminal devices may have no input/output apparatus.

When needing to send data, after performing baseband processing on the to-be-sent data, the processor outputs a baseband signal to the radio frequency circuit; and the radio frequency circuit performs radio frequency processing on the baseband signal and then sends the radio frequency signal to the outside in a form of an electromagnetic wave through the antenna. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data. For ease of description, FIG. 8 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in embodiments of this application.

In this embodiment of this application, the antenna and the radio frequency circuit that have a transceiver function may be considered as a transceiver unit (or communications unit) of the terminal device, and the processor having a processing function may be considered as a processing unit of the terminal device. As shown in FIG. 8, the terminal device includes a transceiver unit 810 and a processing unit 820. The transceiver unit may also be referred to as a transceiver, a transceiver apparatus, or the like. The processing unit may also be referred to as a processor, a processing board, a processing module, a processing apparatus, or the like. Optionally, a component that is in the transceiver unit 810 and that is configured to implement a receiving function may be considered as a receiving unit, and a component that is in the transceiver unit 810 and that is configured to implement a sending function may be considered as a sending unit. In other words, the transceiver unit 810 includes the receiving unit and the sending unit. The transceiver unit sometimes may also be referred to as a transceiver, a transceiver circuit, or the like. The receiving unit sometimes may also be referred to as a receiver, a receive circuit, or the like. The sending unit sometimes may also be referred to as a transmitter, a transmit circuit, or the like.

It should be understood that, the transceiver unit 810 is configured to perform a sending operation and a receiving operation on the terminal device side in the foregoing method embodiment, and the processing unit 820 is configured to perform another operation on the terminal device in the foregoing method embodiment other than the receiving and sending operations.

When the communications apparatus is a chip apparatus or a circuit, the apparatus may include a transceiver unit and a processing unit. The transceiver unit may be an input/output circuit and/or a communications interface. The processing unit is an integrated processor, a microprocessor, or an integrated circuit.

In another form of this embodiment, a computer-readable storage medium is provided, storing instructions. When the instructions are executed, the method on the terminal device side in the method embodiment may be performed.

In another form of this embodiment, a computer program product including instructions is provided. When the instructions are executed, the method on the terminal device side in the method embodiment may be performed.

In another form of this embodiment, a chip is provided. The chip is coupled to a memory, and is configured to read and execute instructions stored in the memory. When the instructions are executed, the method on the terminal device side in the method embodiment may be performed.

Figure 9:
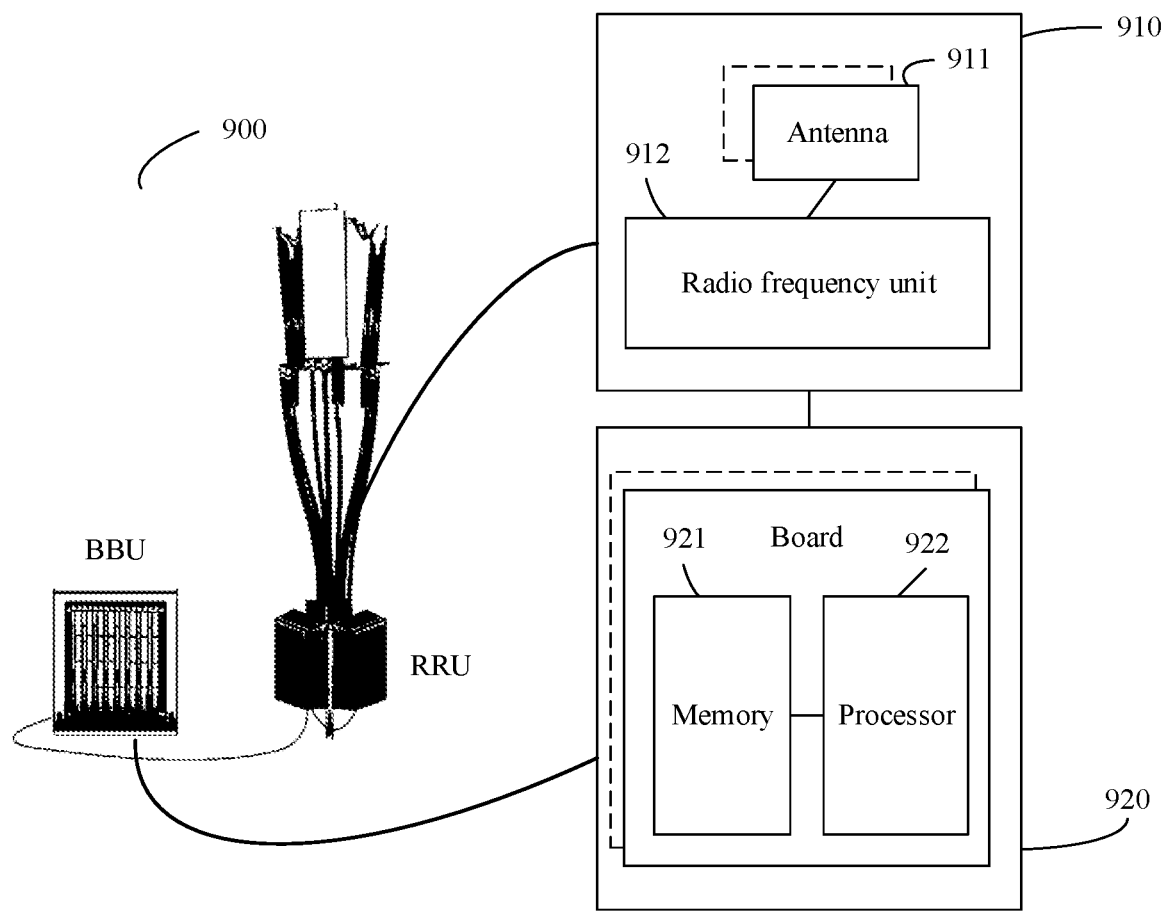
FIG. 9 is a schematic diagram of a structure of a network device according to an embodiment of this application.

When the apparatus in this embodiment is a network device, the network device may be shown in FIG. 9. The apparatus 900 includes one or more radio frequency units, for example, a remote radio unit (RRU) 910, and one or more baseband units (BBU) (which may also be referred to as a digital unit (DU)) 920. The RRU 910 may be referred to as a transceiver unit, and corresponds to the sending unit 603 in FIG. 6. Optionally, the transceiver unit may also be referred to as transceiver machine, a transceiver circuit, a transceiver, or the like, and may include at least one antenna 911 and a radio frequency unit 912. The RRU 910 is mainly configured to receive and send radio frequency signals and perform conversion between a radio frequency signal and a baseband signal, for example, configured to send configuration information to the terminal device. The BBU 920 is mainly configured to perform baseband processing, control a base station, and the like. The RRU 910 and the BBU 920 may be physically disposed together, or may be physically disposed separately, that is, a distributed base station.

The BBU 920 is a control center of the base station, may also be referred to as a processing module, may correspond to the processing unit 602 in FIG. 6, and is mainly configured to implement baseband processing functions, such as channel coding, multiplexing, modulation, and spectrum spreading. For example, the BBU (processing module) may be configured to control the base station to perform an operation procedure related to the network device in the foregoing method embodiment, for example, generate the first indication information.

In an example, the BBU 920 may include one or more boards. A plurality of boards may all support a radio access network of a single access standard (for example, an LTE network), or may respectively support radio access networks of different access standards (for example, an LTE network, 5G, or other networks). The BBU 920 further includes a memory 921 and a processor 922. The memory 921 is configured to store necessary instructions and data. The processor 922 is configured to control the base station to perform a necessary action, for example, configured to control the base station to perform an operation procedure related to the network device in the foregoing method embodiment. The memory 921 and the processor 922 may serve one or more boards. In other words, a memory and a processor may be disposed on each board. Alternatively, a plurality of boards may share a same memory and a same processor. In addition, a necessary circuit may further be disposed on each board.

In another form of this embodiment, a computer-readable storage medium is provided, storing instructions. When the instructions are executed, the method on the network device side in the method embodiment may be performed.

In another form of this embodiment, a computer program product including instructions is provided. When the instructions are executed, the method on the network device side in the method embodiment may be performed.

In another form of this embodiment, a chip is provided. The chip is coupled to a memory, and is configured to read and execute instructions stored in the memory. When the instructions are executed, the method on the network device side in the method embodiment may be performed.

In an implementation process, steps in the method provided in embodiments may be performed by using a hardware integrated logic circuit in the processor, or by using instructions in a form of software. The steps of the method disclosed with reference to embodiments of this application may be directly performed by a hardware processor, or may be performed by using a combination of hardware in the processor and a software module.

It should be noted that, the processor in embodiments of this application may be an integrated circuit chip, and has a signal processing capability. In an implementation process, the steps in the foregoing method embodiments may be performed by using a hardware integrated logical circuit in the processor, or by using instructions in a form of software. The processor may be a general-purpose central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof; or may be a combination that implements a computing function, for example, a combination including one or more microprocessors or a combination of a DSP and a microprocessor. The general-purpose processor may be a microprocessor, or the processor may be any conventional processor or the like.

It may be understood that the memory or storage unit in embodiments of this application may be a volatile memory or a non-volatile memory, or may include a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. By way of example but not limitation, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory of the systems and methods described in this specification includes but is not limited to these and any memory of another proper type.

All or a part of the foregoing embodiments may be implemented by using software, hardware, firmware, or any combination thereof. When software is used to implement embodiments, all or a part of embodiments may be implemented in a form of a computer program product. The computer program product includes one or more computer programs or instructions. When the computer programs or instructions are loaded and executed on a computer, the procedure or functions according to embodiments of this application are all or partially implemented. The computer may be a general-purpose computer, a dedicated computer, a computer network, or another programmable apparatus. The computer instructions may be stored in a computer-readable storage medium, or may be transmitted by using the computer-readable storage medium. The computer-readable storage medium may be any usable medium that can be accessed by a computer or a data storage device such as a server integrating one or more usable media. The usable medium may be a magnetic medium, for example, a floppy disk, a hard disk, or a magnetic tape, or may be an optical medium, for example, a DVD, or may be a semiconductor medium, for example, a solid-state drive (SSD).

The various illustrative logical units and circuits described in embodiments of this application may implement or operate the described functions by using a general-purpose processor, a digital signal processor, an application-specific integrated circuit (ASIC), a field programmable gate array (FPGA), another programmable logic apparatus, a discrete gate or transistor logic, a discrete hardware component, or a design of any combination thereof. The general-purpose processor may be a microprocessor. Optionally, the general-purpose processor may also be any conventional processor, controller, microcontroller, or state machine. The processor may also be implemented by a combination of computing apparatuses, such as a digital signal processor and a microprocessor, a plurality of microprocessors, one or more microprocessors in combination with a digital signal processor core, or any other similar configuration.

Steps of the methods or algorithms described in embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to a processor, so that the processor can read information from the storage medium and write information into the storage medium. Alternatively, the storage medium may be integrated into a processor. The processor and the storage medium may be disposed in an ASIC, and the ASIC may be disposed in a terminal device. Alternatively, the processor and the storage medium may also be disposed in different components of the terminal device.

These computer program instructions may alternatively be loaded onto the computer or the another programmable data processing device, so that a series of operations steps are performed on the computer or the another programmable device to generate computer-implemented processing, and instructions executed on the computer or the another programmable device provide steps for implementing a function specified in one or more procedures in the flowchart and/or one or more blocks in the block diagram.

It should be understood that "one embodiment" or "an embodiment" mentioned in the entire specification means that particular features, structures, or characteristics related to embodiments are included in at least one embodiment of this application. Therefore, "in one embodiment" or "in an embodiment" appearing throughout the specification does not refer to a same embodiment. In addition, these particular features, structures, or characteristics may be combined in one or more embodiments by using any appropriate manner. It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in embodiments of this application, "B corresponding to A" indicates that B is associated with A, and B may be determined based on A. However, it should further be understood that determining B based on A does not mean that B is determined based only on A. B may alternatively be determined based on A and/or other information.

A person of ordinary skill in the art may be aware that, in combination with the examples described in embodiments disclosed in this specification, units and algorithm steps can be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraints of technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. Indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve objectives of solutions of embodiments of this application.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

With descriptions of the foregoing implementations, a person skilled in the art may clearly understand that this application may be implemented by hardware, firmware, or a combination thereof. When this application is implemented by software, the foregoing functions may be stored in a computer-readable medium or transmitted as one or more instructions or code in a computer-readable medium. The computer-readable medium includes a computer storage medium and a communications medium. The communications medium includes any medium that facilitates transmission of a computer program from one place to another. The storage medium may be any available medium accessible to a computer. The following provides an example but does not impose a limitation: The computer-readable medium may include a RAM, a ROM, an EEPROM, a CD-ROM or another optical disc storage, a magnetic disk storage medium or another magnetic storage device, or any other medium that can be used to carry or store expected program code in a form of an instruction or a data structure and can be accessed by the computer. In addition, any connection may be appropriately used as a computer-readable medium. For example, if software is transmitted from a website, a server, or another remote source by using a coaxial cable, an optical fiber/cable, a twisted pair, a digital subscriber line (DSL), or wireless technologies such as infrared ray, radio, and microwave, the coaxial cable, optical fiber/cable, twisted pair, DSL, or wireless technologies such as infrared ray, radio, and microwave are included in fixation of a medium to which they belong. For example, a disk and disc used in this application includes a compact disc (CD), a laser disc, an optical disc, a digital versatile disc (DVD), a floppy disk, and a Blu-ray disc, where the disk generally copies data in a magnetic manner, and the disc copies data optically in a laser manner. The foregoing combination shall also be included in the protection scope of the computer-readable medium.

It will be appreciated that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A method for determining a number of sounding reference signal (SRS) and/or physical uplink shared channel (PUSCH) repetitions, comprising:

receiving, by a terminal, trigger information from a network side device via a first radio resource control (RRC) signaling, wherein the trigger information indicates that the terminal is to determine a first number of SRS and/or PUSCH repetitions from a valid modulation and coding scheme (MCS) index value of an MCS field of downlink control information (DCI), and wherein the trigger information corresponds to an RRC signaling dynamic repetition parameter being set to a first value;

receiving, by the terminal, the DCI from the network side device; and determining, by the terminal, the first number of SRS and/or PUSCH repetitions from the valid MCS index value of the MCS field of the DCI, wherein the valid MCS index value indicates a communication parameter to the terminal, wherein the communication parameter indicates a modulation order and code rate for a PUSCH;

wherein the method further comprises:

receiving, by the terminal from the network side device, a second RRC signaling in which a second RRC signaling dynamic repetition parameter is set to a second value different from the first value; and receiving, by the terminal, second DCI from the network side device, wherein, based on the second RRC signaling dynamic repetition parameter being set to the second value, the terminal does not attempt to determine a number of SRS and/or PUSCH repetitions from a second valid MCS index value of a second MCS field of the second DCI;

wherein for a plurality of respective DCI, respective valid MCS index values indicate respective combinations of numbers of SRS and PUSCH repetitions.

2. A method for indicating a number of sounding reference signal (SRS) and/or physical uplink shared channel (PUSCH) repetitions, comprising:

sending, by a network side device, trigger information to a terminal via a first radio resource control (RRC) signaling, wherein the trigger information indicates that the terminal is to determine a first number of SRS and/or PUSCH repetitions from a valid modulation and coding scheme (MCS) index value of an MCS field of downlink control information (DCI), and wherein the trigger information corresponds to an RRC signaling dynamic repetition parameter being set to a first value; and sending, by the network side device, the DCI to the terminal, wherein the DCI comprises the valid MCS index value of the MCS field indicating the first number of SRS and/or PUSCH repetitions, wherein the valid MCS index value indicates a communication parameter to the terminal, wherein the communication parameter indicates a modulation order and code rate for a PUSCH;

wherein the method further comprises:
sending, by the network side device to the terminal, a second RRC signaling in which a second RRC signaling dynamic repetition parameter is set to a second value different from the first value, wherein the second RRC signaling dynamic repetition parameter being set to the second value indicates to the terminal not to attempt to determine a number of SRS and/or PUSCH repetitions from a second valid MCS index value of a second MCS field of second DCI; and sending, by the network side device, the second DCI to the terminal;

wherein for a plurality of respective DCI, respective valid MCS index values indicate respective combinations of numbers of SRS and PUSCH repetitions.

3. An apparatus for determining a number of sounding reference signal (SRS) and/or physical uplink shared channel (PUSCH) repetitions, comprising:
at least one processor; and
a memory storing programming instructions for execution by the at least one processor;
wherein the at least one processor is configured to execute the programming instructions to facilitate performance of the following operations by the apparatus:
receiving trigger information from a network side device via a first radio resource control (RRC) signaling, wherein the trigger information indicates that the apparatus is to determine a first number of SRS and/or PUSCH repetitions from a valid modulation and coding scheme (MCS) index value of an MCS field of downlink control information (DCI), and wherein the trigger information corresponds to an RRC signaling dynamic repetition parameter being set to a first value;
receiving the DCI from the network side device; and
determining the first number of SRS and/or PUSCH repetitions from the valid MCS index value of the MCS field of the DCI, wherein the valid MCS index value indicates a communication parameter to the apparatus, wherein the communication parameter indicates a modulation order and code rate for a PUSCH;

wherein the at least one processor is further configured to execute the programming instructions to facilitate performance of the following operations by the apparatus:
receiving, from the network side device, a second RRC signaling in which a second RRC signaling dynamic repetition parameter is set to a second value different from the first value, wherein the second RRC signaling dynamic repetition parameter being set to the second value indicates to the apparatus not to attempt to determine a number of SRS and/or PUSCH repetitions from a second valid MCS index value of a second MCS field of second DCI; and receiving the second DCI from the network side device;
wherein for a plurality of respective DCI, respective valid MCS index values indicate respective combinations of numbers of SRS and PUSCH repetitions.

4. An apparatus for indicating a number of sounding reference signal (SRS) and/or physical uplink shared channel (PUSCH) repetitions, comprising:
at least one processor; and
a memory storing programming instructions for execution by the at least one processor;
wherein the at least one processor is configured to execute the programming instructions to facilitate performance of the following operations by the apparatus:
sending trigger information to a terminal via a first radio resource control (RRC) signaling, wherein the trigger information indicates that the terminal is to determine a first number of SRS and/or PUSCH repetitions from a valid modulation and coding scheme (MCS) index value of an MCS field of downlink control information (DCI), and wherein the trigger information corresponds to an RRC signaling dynamic repetition parameter being set to a first value; and
sending the DCI to the terminal, wherein the DCI comprises the valid MCS index value of the MCS field indicating the first number of SRS and/or PUSCH repetitions, wherein the valid MCS index value indicates a communication parameter to the terminal, wherein the communication parameter indicates a modulation order and code rate for a PUSCH;

wherein the at least one processor is further configured to execute the programming instructions to facilitate performance of the following operations by the apparatus:
sending, to the terminal, a second RRC signaling in which a second RRC signaling dynamic repetition parameter is set to a second value different from the first value, wherein the second RRC signaling dynamic repetition parameter being set to the second value indicates to the terminal not to attempt to determine a number of SRS and/or PUSCH repetitions from a second valid MCS index value of a second MCS field of second DCI; and
sending the second DCI to the terminal;
wherein for a plurality of respective DCI, respective valid MCS index values indicate respective combinations of numbers of SRS and PUSCH repetitions.

5. The method according to claim 1, wherein for three respective DCI including a first respective DCI, a second respective DCI, and a third respective DCI, first, second and third respective valid MCS index values indicate first, second and third respective numbers of SRS repetitions;
wherein the first respective valid MCS index value is higher than the second respective valid MCS index value, and the second respective valid MCS index value is higher than the third respective valid MCS index value; and
wherein the first respective number of SRS repetitions is lower than the second respective number of SRS repetitions, and the second respective number of SRS repetitions is lower than the third respective number of SRS repetitions.

6. The method according to claim 5, wherein the first respective valid MCS index value corresponds to a modulation order of 6, the second respective valid MCS index value corresponds to a modulation order of 4, and the third respective valid MCS index value corresponds to a modulation order of 2; and wherein the first respective number of SRS repetitions is 1, the second respective number of SRS repetitions is 2, and the third respective number of SRS repetitions is 4.

7. The method according to claim 1, wherein for three respective DCI including a first respective DCI, a second respective DCI, and a third respective DCI, first, second and third ranges of respective valid MCS index values correspond to first, second and third respective numbers of SRS repetitions.

8. The method according to claim 1, wherein for four respective DCI including a first respective DCI, a second respective DCI, a third respective DCI, and a fourth respective DCI, first, second, third and fourth respective valid MCS index values indicate first, second, third and fourth respective numbers of PUSCH repetitions;

wherein the first respective valid MCS index value is higher than the second respective valid MCS index value, the second respective valid MCS index value is higher than the third respective valid MCS index value, and the third respective valid MCS index value is higher than the fourth respective valid MCS index value; and wherein the first respective number of PUSCH repetitions is lower than the second respective number of PUSCH repetitions, the second respective number of PUSCH repetitions is lower than the third respective number of PUSCH repetitions, and the third respective number of PUSCH repetitions is lower than the fourth respective number of PUSCH repetitions.

9. The method according to claim 8, wherein the first respective number of PUSCH repetitions is 1, the second respective number of PUSCH repetitions is 2, the third respective number of PUSCH repetitions is 4, and the fourth respective number of PUSCH repetitions is 8.

10. The method according to claim 1, wherein for four respective DCI including a first respective DCI, a second respective DCI, a third respective DCI, and a fourth respective DCI, first, second, third and fourth respective ranges of valid MCS index values indicate first, second, third and fourth respective numbers of PUSCH repetitions.

11. The method according to claim 1, wherein for six respective DCI including a first respective DCI, a second respective DCI, a third respective DCI, a fourth respective DCI, a fifth respective DCI and a sixth respective DCI, first, second, third, fourth, fifth and sixth respective valid MCS index values indicate first, second, third, fourth, fifth and sixth respective combinations of numbers of SRS and PUSCH repetitions.

12. The method according to claim 11, wherein the first respective valid MCS index value is higher than the second respective valid MCS index value, the second respective valid MCS index value is higher than the third respective valid MCS index value, the third respective valid MCS index value is higher than the fourth respective valid MCS index value, the fourth respective valid MCS index value is higher than the fifth respective valid MCS index value, and the fifth respective valid MCS index value is higher than the sixth respective valid MCS index value; and wherein the first respective combination corresponds to 1 SRS repetition and 1 PUSCH repetition, the second respective combination corresponds to 1 SRS repetition and 2 PUSCH repetitions, the third respective combination corresponds to 2 SRS repetitions and 2 PUSCH repetitions, the fourth respective combination corresponds to 2 SRS repetitions and 4 PUSCH repetitions, the fifth respective combination corresponds to 4 SRS repetitions and 4 PUSCH repetitions, and the sixth respective combination corresponds to 4 SRS repetitions and 8 PUSCH repetitions.

13. The method according to claim 2, wherein for three respective DCI including a first respective DCI, a second respective DCI, and a third respective DCI, first, second and third respective valid MCS index values indicate first, second and third respective numbers of SRS repetitions;

wherein the first respective valid MCS index value is higher than the second respective valid MCS index value, and the second respective valid MCS index value is higher than the third respective valid MCS index value; and wherein the first respective number of SRS repetitions is lower than the second respective number of SRS repetitions, and the second respective number of SRS repetitions is lower than the third respective number of SRS repetitions.

14. The method according to claim 13, wherein the first respective valid MCS index value corresponds to a modulation order of 6, the second respective valid MCS index value corresponds to a modulation order of 4, and the third respective valid MCS index value corresponds to a modulation order of 2; and wherein the first respective number of SRS repetitions is 1, the second respective number of SRS repetitions is 2, and the third respective number of SRS repetitions is 4.

15. The method according to claim 2, wherein for three respective DCI including a first respective DCI, a second respective DCI, and a third respective DCI, first, second and third ranges of respective valid MCS index values correspond to first, second and third respective numbers of SRS repetitions.

16. The method according to claim 2, wherein for four respective DCI including a first respective DCI, a second respective DCI, a third respective DCI, and a fourth respective DCI, first, second, third and fourth respective valid MCS index values indicate first, second, third and fourth respective numbers of PUSCH repetitions;

wherein the first respective valid MCS index value is higher than the second respective valid MCS index value, the second respective valid MCS index value is higher than the third respective valid MCS index value, and the third respective valid MCS index value is higher than the fourth respective valid MCS index value; and wherein the first respective number of PUSCH repetitions is lower than the second respective number of PUSCH repetitions, the second respective number of PUSCH repetitions is lower than the third respective number of PUSCH repetitions, and the third respective number of PUSCH repetitions is lower than the fourth respective number of PUSCH repetitions.

17. The method according to claim 16, wherein the first respective number of PUSCH repetitions is 1, the second respective number of PUSCH repetitions is 2, the third respective number of PUSCH repetitions is 4, and the fourth respective number of PUSCH repetitions is 8.

18. The method according to claim 2, wherein for four respective DCI including a first respective DCI, a second respective DCI, a third respective DCI, and a fourth respective DCI, first, second, third and fourth respective ranges of valid MCS index values indicate first, second, third and fourth respective numbers of PUSCH repetitions.

19. The apparatus according to claim 3, wherein for six respective DCI including a first respective DCI, a second respective DCI, a third respective DCI, a fourth respective DCI, a fifth respective DCI and a sixth respective DCI, first, second, third, fourth, fifth and sixth respective valid MCS index values indicate first, second, third, fourth, fifth and sixth respective combinations of numbers of SRS and PUSCH repetitions.

20. The apparatus according to claim 4, wherein for six respective DCI including a first respective DCI, a second respective DCI, a third respective DCI, a fourth respective DCI, a fifth respective DCI and a sixth respective DCI, first, second, third, fourth, fifth and sixth respective valid MCS index values indicate first, second, third, fourth, fifth and sixth respective combinations of numbers of SRS and PUSCH repetitions.

* * * * *